(12) United States Patent
Hanafusa et al.

(10) Patent No.: US 11,326,990 B2
(45) Date of Patent: May 10, 2022

(54) AUTONOMOUS PREPROCESSING DEVICE AND ANALYSIS SYSTEM PROVIDED WITH THE AUTONOMOUS PREPROCESSING DEVICE

(71) Applicant: SHIMADZU CORPORATION, Kyoto (JP)

(72) Inventors: Nobuhiro Hanafusa, Kyoto (JP); Daisuke Kawakami, Kyoto (JP); Hikaru Shibata, Kyoto (JP); Takafumi Tanigaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 80 days.

(21) Appl. No.: 16/091,342

(22) PCT Filed: May 20, 2016

(86) PCT No.: PCT/JP2016/065035
§ 371 (c)(1),
(2) Date: Oct. 4, 2018

(87) PCT Pub. No.: WO2017/199432
PCT Pub. Date: Nov. 23, 2017

(65) Prior Publication Data
US 2019/0154553 A1 May 23, 2019

(51) Int. Cl.
*G01N 30/06* (2006.01)
*G01N 1/38* (2006.01)
(Continued)

(52) U.S. Cl.
CPC .............. *G01N 1/38* (2013.01); *G01N 30/06* (2013.01); *G01N 35/02* (2013.01); *G01N 35/10* (2013.01)

(58) Field of Classification Search
CPC ............ G01K 1/04; G01K 1/14; G01K 1/143; G01K 1/146; G01K 13/02; G01F 1/684;
(Continued)

(56) References Cited

U.S. PATENT DOCUMENTS 4,774,055 A * 9/1988 Wakatake ............ G01N 21/253
422/562
4,836,038 A * 6/1989 Baldwyn ................ G01N 30/24
73/864.21
(Continued)

FOREIGN PATENT DOCUMENTS

JP 58-109679 U 7/1983
JP 08-10214 B2 1/1996
(Continued)

OTHER PUBLICATIONS

Communication dated Aug. 14, 2019, from the Japanese Patent Office in counterpart application No. English 2018-518047 Translation.
(Continued)

*Primary Examiner* — Tran M. Tran
(74) *Attorney, Agent, or Firm* — Sughrue Mion, PLLC

(57) ABSTRACT

A pretreating apparatus includes a transferring mechanism configured to transfer a storing container storing an unpretreated sample or a pretreated sample, a pretreating portion having a port in which the storing container storing the sample is installed by the transferring mechanism, configured to pretreat the sample in the storing container installed in the port, and a diluting portion configured to suck a predetermined amount of the pretreated sample from the storing container and supply the sample and a diluent to an empty storing container to dilute the sample.

14 Claims, 22 Drawing Sheets

(51) Int. Cl.
*G01N 35/02* (2006.01)
*G01N 35/10* (2006.01)

(58) Field of Classification Search
CPC .......... G01F 5/18; G01N 1/2294; G01N 1/20; G01N 2001/2284; G01N 2001/105; G01N 1/14; G01N 1/18; F16L 41/008
See application file for complete search history.

(56) References Cited

U.S. PATENT DOCUMENTS

| | | | | |
|---|---|---|---|---|
| 4,974,458 A * | 12/1990 | Koike | | G01N 1/28 73/864.25 |
| 5,305,650 A * | 4/1994 | Koike | | G01N 1/28 73/864.21 |
| 5,441,699 A * | 8/1995 | So | | G01N 1/2035 422/63 |
| 5,501,984 A * | 3/1996 | Hofstetter | | G01N 35/1065 422/63 |
| 5,560,889 A * | 10/1996 | Ogino | | G01N 1/40 356/39 |
| 5,876,668 A * | 3/1999 | Kawashima | | G01N 35/025 422/63 |
| 5,882,594 A * | 3/1999 | Kawaguchi | | G01N 35/025 422/63 |
| 6,066,298 A * | 5/2000 | Fukunaga | | G01N 1/38 134/170 |
| 6,148,680 A * | 11/2000 | Baeuerle | | G01N 30/22 73/864.25 |
| 6,190,614 B1 * | 2/2001 | Fukunaga | | G01N 1/38 422/510 |
| 6,409,968 B1 * | 6/2002 | Takahashi | | G01N 21/253 422/552 |
| 7,270,783 B2 * | 9/2007 | Takase | | G01N 35/025 422/65 |
| 7,341,691 B2 * | 3/2008 | Tamura | | G01N 35/025 422/562 |
| 7,390,458 B2 * | 6/2008 | Burow | | B01L 9/523 422/63 |
| 7,526,947 B2 * | 5/2009 | Tatsumi | | G01N 35/1097 422/70 |
| 7,662,345 B2 * | 2/2010 | Kawahara | | B01L 3/5025 422/504 |
| 7,842,237 B1 * | 11/2010 | Shibuya | | G01N 35/026 422/65 |
| 7,913,720 B2 * | 3/2011 | Tribble | | B65B 59/00 141/104 |
| 8,604,425 B2 * | 12/2013 | Kanda | | G01N 1/405 250/281 |
| 8,926,903 B2 * | 1/2015 | Nogami | | G01N 1/405 250/288 |
| 9,229,018 B2 * | 1/2016 | Toyoshima | | G01N 35/1002 |
| 9,335,336 B2 * | 5/2016 | Silbert | | G01F 23/265 |
| 9,400,285 B2 * | 7/2016 | Ochranek | | G01N 35/04 |
| 9,606,136 B2 * | 3/2017 | Bucher | | G01N 35/026 |
| 9,804,184 B2 * | 10/2017 | Yaita | | B01F 7/00258 |
| 9,817,013 B2 * | 11/2017 | Yanami | | B01F 11/008 |
| 9,885,732 B2 * | 2/2018 | Nogami | | G01N 35/025 |
| 9,921,235 B2 * | 3/2018 | Mizutani | | G01N 35/1011 |
| 10,001,497 B2 * | 6/2018 | Ochranek | | G01N 35/04 |
| 10,184,948 B2 * | 1/2019 | Yasui | | G01N 35/1002 |
| 10,466,261 B2 * | 11/2019 | Sano | | G01N 35/02 |
| 10,473,630 B2 * | 11/2019 | Hanafusa | | G01N 1/10 |
| 10,488,374 B2 * | 11/2019 | Hanafusa | | G01N 30/24 |
| 10,884,009 B2 * | 1/2021 | Tanoue | | G01F 23/26 |
| 2010/0119415 A1 * | 5/2010 | Ogusu | | G01N 35/1002 422/81 |
| 2010/0233794 A1 * | 9/2010 | Iwamura | | G01N 33/491 435/287.3 |
| 2011/0157580 A1 | 6/2011 | Nogami et al. | | |
| 2012/0039748 A1 * | 2/2012 | Mimura | | G01N 35/025 422/63 |
| 2012/0048036 A1 * | 3/2012 | Mimura | | G01N 35/025 73/863.01 |
| 2012/0121464 A1 * | 5/2012 | Nogami | | G01N 35/00663 422/68.1 |
| 2017/0168027 A1 | 6/2017 | Hanafusa et al. | | |
| 2019/0018032 A1 * | 1/2019 | Sakamoto | | G01N 35/026 |
| 2019/0041415 A1 * | 2/2019 | Nonaka | | G01N 35/1004 |

FOREIGN PATENT DOCUMENTS

| | | |
|---|---|---|
| JP | 2002286726 A | 10/2002 |
| JP | 2009-294118 A | 12/2009 |
| JP | 2010-060474 A | 3/2010 |
| WO | 9312431 A1 | 6/1993 |
| WO | 2016/017042 A1 | 2/2016 |

OTHER PUBLICATIONS

Communication dated Dec. 10, 2019, from the European Patent Office in application No. 16902451.0.

International Search Report of PCT/JP2016/065035 dated Aug. 16, 2016 [PCT/ISA/210].

Notice of Reasons for Refusal dated Dec. 2, 2019 issue by the Japanese Patent Office in counterpart application No. 2018-518047.

* cited by examiner

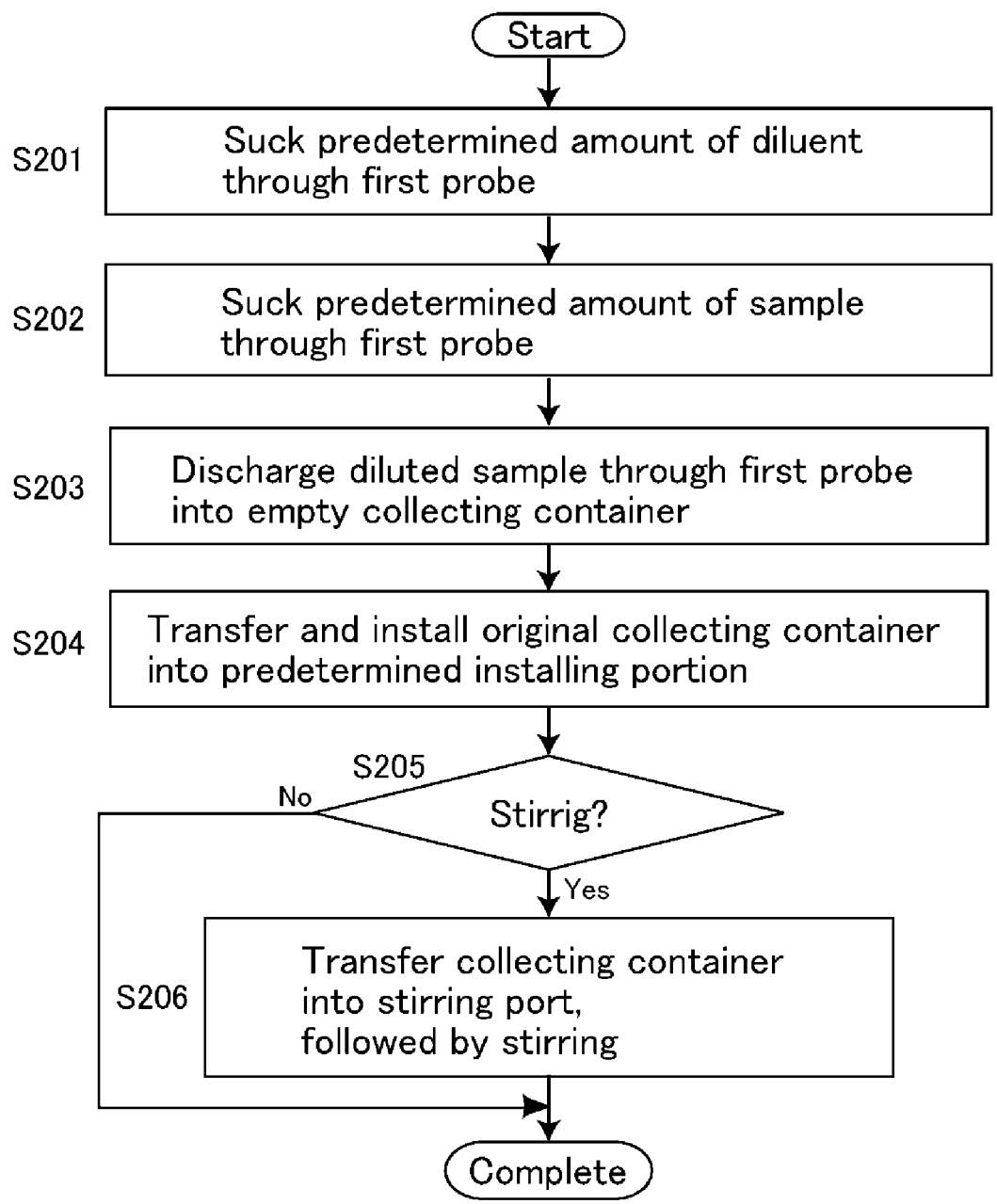

AUTONOMOUS PREPROCESSING DEVICE AND ANALYSIS SYSTEM PROVIDED WITH THE AUTONOMOUS PREPROCESSING DEVICE

CROSS REFERENCE TO RELATED APPLICATIONS

This application is a National Stage of International Application No. PCT/JP2016/065035, filed May 20, 2016.

TECHNICAL FIELD

The present invention relates to a pretreating container for performing pretreatment such as extracting treatment by which, out of components contained in a biological sample such as whole blood, serum, plasma, blood in a filter paper or urine, specific components unnecessary for analysis are removed and necessary components are extracted as a sample, a pretreating apparatus for automatically performing the pretreatment using the pretreating container, and an analyzing system equipped with the pretreating apparatus for automatically performing a series of treatments from the pretreatment of a sample to the analysis thereof.

BACKGROUND ART

When performing a quantitative analysis or the like for a sample such as a biological sample, it may be necessary to perform a treatment for removing specific components unnecessary for analysis and extracting necessary components as a sample from the biological sample, or a drying treatment for concentrating and drying an extracted sample. As a pretreating apparatus for automatically performing such a pretreatment, various apparatuses have been conventionally proposed and executed (for example, see Patent Document 1).

For example, Patent Document 1, for example, discloses that a common transferring mechanism holds a plurality of cartridges holding a separating agent through which a sample is passed for separation of a specific component, the transferring mechanism sequentially arranges the cartridges on a pressure loading mechanism provided at a predetermined position, and a pressure is applied to the cartridge in the pressure loading mechanism to extract the sample. In this case, a plurality of extracted solution receptacles for receiving an extracted solution from the cartridge are relatively moved with respect to the cartridge, and sequentially arranged on the pressure loading mechanism by another transferring mechanism different from that for the cartridge below the cartridge, resulting in continuous extraction of the sample.

However, according to the above-mentioned manner, during extracting treatment of a sample in the pressure loading mechanism, it is impossible to operate the transferring mechanisms for the cartridge and the extracted solution receptacle, and thus, there is a limit in improving the pretreatment efficiency. Accordingly, the inventors of the present invention have proposed to improve the pretreatment efficiency by transferring a separating device having a filter for filtrating a sample and a collecting container for collecting the sample extracted from the separating device as one set in a random access manner to a port in which treatments such as filtrating and stirring treatments are performed (See Patent Document 2).

PRIOR ART DOCUMENTS

Patent Documents

Patent Document 1: Japanese Unexamined Patent Laid-open Publication No. 2010-60474
Patent Document 2: WO2016/017042A1

SUMMARY OF THE INVENTION

Problems to be Solved by the Invention

In the pretreating apparatus as described above, it is possible to arrange an analyzing apparatus such as a liquid chromatography apparatus adjacent to the pretreating apparatus, thereby automatically transferring the pretreated sample to the adjacent apparatus. However, depending on high concentration of the target component in the pretreated sample, analytical condition, or the like, it may be necessary to dilute the sample. In that case, the pretreated sample cannot be transferred to the adjacent analyzing apparatus as it is.

Accordingly, it is an object of the present invention to allow to dilute a sample in the pretreating apparatus.

Solutions to the Problems

The pretreating apparatus according to the present invention includes a transferring mechanism configured to transfer a storing container storing an unpretreated sample or a pretreated sample, a pretreating portion having a port in which the storing container storing the sample is installed by the transferring mechanism, configured to pretreat the sample in the storing container installed in the port, and a diluting portion configured to suck a predetermined amount of the pretreated sample from the storing container and supply the sample and a diluent to an empty storing container to dilute the sample.

The diluting portion includes a first probe and a second probe configured to suck and discharge liquid, preferably configured to suck a predetermined amount of the sample from the storing container through the first probe, and then suck any remaining sample from the storing container through the second probe. By doing so, the storing container storing the sample becomes empty, so that the storing container can be reused.

The diluting portion is preferably configured to suck the diluent through the first probe and then suck the pretreated sample from the storing container through the first probe. By doing so, the sample and the diluent can be simultaneously discharged to a predetermined storing container, so that the time required for diluting the sample is shortened.

In the above case, the diluting portion is preferably configured to discharge the sample through the first probe to the storing container out of which the whole sample has been sucked through the second probe. By doing so, the storing container originally storing the sample can be reused as a container for storing the diluted sample. This makes it possible not to use a new storing container, thereby suppressing an increase in cost, as well omitting operation of installing a new storing container.

Note that when the sample in the storing container is only sucked through the second probe, the sample may stick to and remain on the inner wall of the storing container, possibly preventing the storing container from being reused as it is. Accordingly, the diluting portion is preferably configured to suck the whole sample in the storing container through the second probe, then supply and suck a cleaning solution into and from the storing container, and subsequently discharge the sample through the first probe. By doing so, it is possible to completely remove the sample in the storing container originally storing the sample.

The diluting portion may further include a third probe configured to discharge the cleaning solution.

The diluting portion is preferably configured to suck a predetermined amount of the sample from the storing container through the first probe, then simultaneously insert the second probe and the third probe into the storing container, suck the whole sample from the storing container through the second probe, and subsequently supply a cleaning solution through the third probe into the storing container and suck the cleaning solution through the second probe. By doing so, operation such as sucking a sample from the storing container, supplying a cleaning solution and sucking a cleaning solution can be rapidly performed, and the inside of the storing container can be efficiently cleaned.

The first probe and the second probe are preferably configured to move in a horizontal plane direction and a vertical direction by a common driving mechanism. By doing so, it is possible to eliminate individual driving mechanisms for moving the respective probes, thereby suppressing an increase in cost, as well suppressing the size of the entire apparatus.

In addition, the pretreated sample not used for dilution may be desired to be left for later analysis. In order to deal with such a case, it may be configured in such a way that a pretreated sample port configured to store the storing container storing the pretreated sample is further provided, and the storing container storing the remaining sample after a predetermined amount of the sample is sucked by the diluting portion is transferred into the pretreated sample port by the transferring mechanism.

The storing container storing the pretreated sample is installed by the transferring mechanism, and separately from the port of the pretreating portion, a diluting port may be provided configured to perform dilution of the sample in the installed storing container by the diluting portion.

In a case where a transferring apparatus is provided configured to have a transferring port in which the storing container storing the sample diluted by the diluting portion is installed by the transferring mechanism, and move the transferring port so as to transfer to the outside of the pretreating apparatus the storing container installed in the transferring port, it is preferable that the diluting port be provided in the vicinity of the transferring port. By doing so, the pretreated sample can be diluted in the vicinity of the transferring apparatus and rapidly transferred.

The analyzing system according to the present invention includes the pretreating apparatus of the present invention, and a liquid chromatograph system arranged adjacent to the pretreating apparatus, having an analyzing flow path through which a mobile phase flows, a sample injecting apparatus configured to collect the sample in the collecting container installed in the transferring port arranged outside the pretreating apparatus by the transferring apparatus of the pretreating apparatus and inject the collected sample into the analyzing flow path, an analyzing column arranged on the analyzing flow path, configured to separate the sample injected by the sample injecting apparatus for each component, and a detector configured to detect sample components separated by the analyzing column.

Effects of the Invention

The pretreating apparatus of the present invention includes the diluting portion configured to suck a predetermined amount of a pretreated sample from the storing container and supply the sample and a diluent to an empty storing container to dilute the sample, so that it is possible to automatically dilute the pretreated sample in the pretreating apparatus.

On the analyzing system of the present invention, the liquid chromatograph system is installed adjacent to the pretreating apparatus of the present invention, and the sample injecting apparatus of the liquid chromatograph system is configured to collect a sample from the collecting container placed outside the pretreating apparatus by the transferring apparatus provided on the pretreating apparatus and analyze the collected sample, so that a series of all treatments from pretreatment of a sample to analysis thereof can be automatically performed.

BRIEF DESCRIPTION OF THE DRAWINGS

FIG. 19 is a flowchart showing an example of diluting operation of the embodiment.

EMBODIMENTS OF THE INVENTION

Figure 1:
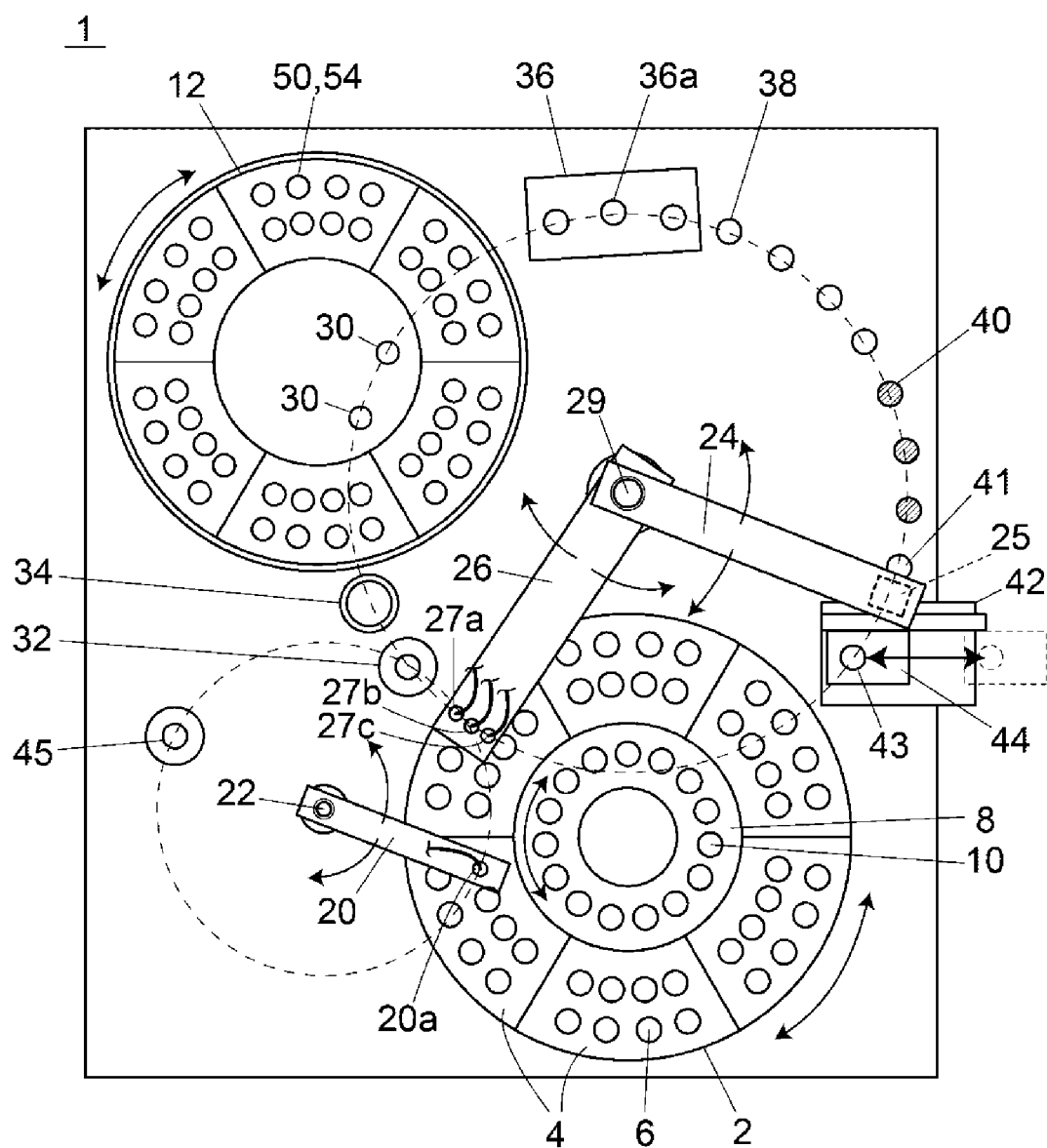
FIG. 1 is a plan view showing an embodiment of a pretreating apparatus.

A description is made of an embodiment of the pretreating apparatus with reference to FIG. 1.

A pretreating apparatus 1 of this embodiment performs necessary pretreating items for each sample using each of the pretreating containers consisting of prepared sets of a separating device 50 and a collecting container 54 (storing container). The pretreating apparatus 1 is provided with a plurality of treating ports for performing the respective pretreating items, in which the pretreating item corresponding to each of the treating ports is performed on a sample stored in the pretreating container by placing the pretreating container containing the sample in one of the treating ports. Each of the treating ports is described later. The pretreating item is an item of pretreatment necessary for performing an analytic item specified by an analyzer.

The separating device 50 and the collecting container 54 constituting the pretreating container are transferred by a transferring arm 24 constituting a transferring mechanism. The transferring arm 24 has a holding portion 25 at the distal end side of the transferring arm 24 for holding the separating device 50 and the collecting container 54, configured in such a way that the holding portion 25 rotates about in a horizontal plane with a vertical shaft 29 as the center of rotation so as to draw an arcuate trajectory, which vertical shaft 29 supports the base end portion of the transferring arm 24. The respective treating ports and other ports into which the separating device 50 and the collecting container 54 are transferred are all provided along the arcuate trajectory drawn by the holding portion 25.

A sample installing portion 2 for installing a sample container 6 storing a sample is provided, and in the vicinity of the sample installing portion 2, a sampling arm 20 serving as a sampling portion for collecting the sample from the sample container installed in the sample installing portion 2 is provided. In the sample installing portion 2, a sample rack 4 for holding a plurality of the sample containers 6 is installed annularly. The sample installing portion 2 rotates in a horizontal plane so as to move the sample rack 4 in its circumferential direction, and by the rotation of the sample installing portion 2, a desired sample container 6 is arranged at a predetermined sampling position. The sampling position is a position along the trajectory of a sampling nozzle 20a at the distal end of the sampling arm 20 and a position at which the sample is collected by the sampling nozzle 20a.

The sampling arm 20 has the base end portion through which a vertical shaft 22 penetrates, and performs a rotational motion in a horizontal plane with the shaft 22 as the center of rotation and a vertical movement along the shaft 22 in a vertical direction. The sampling nozzle 20a is held in such a way that the distal end of the sampling nozzle 20a faces vertically downward at the distal end side of the sampling arm 20, and performs a movement drawing an arcuate trajectory in a horizontal plane by the sampling arm 20 and a vertical movement in a vertical direction.

A dispensing port 32 is provided at a position on the trajectory of the sampling nozzle 20a and on the trajectory of the holding portion 25 of the transferring arm 24. The dispensing port 32 is a port in which the sampling nozzle 20a dispenses a sample to an unused separating device 50. The unused separating device 50 is installed in the dispensing port 32 by the transferring arm 24.

Inside the sample installing portion 2, a reagent installing portion 8 for installing a reagent container 10 is provided, and a reagent arm 26 (reagent adding portion) for collecting a reagent from the reagent container installed in the reagent installing portion 8 is provided. The reagent arm 26 has the base end supported by the vertical shaft 29 by which the transferring arm 24 is commonly supported, and rotates in a horizontal plane and vertically moves. A first probe 27a, a second probe 27b and a third probe 27c are provided at the distal end portion of the reagent arm 26. These probes 27a, 27b and 27c are provided in a state where their tips face vertically downward, and perform a movement drawing the same arcuate trajectory as drawn by the holding portion 25 of the transferring arm 24 in a horizontal plane and a vertical movement. The first probe 27a, second probe 27b and third probe 27c are described later. The first probe 27a has the base end connected to a syringe pump 88 (see FIG. 3) that sucks or discharges liquid, and a tip through which liquid such as a reagent, sample and diluent is sucked and discharged.

The reagent installing portion 8 rotates in a horizontal plane independently of the sample installing portion 2. A plurality of the reagent containers 10 are annularly arranged on the reagent installing portion 8, and the reagent containers 10 are transferred in their rotational direction by rotation of the reagent installing portion 8, so that a desired reagent container 10 is arranged at a predetermined reagent collecting position. The reagent collecting position is a position along the trajectory of the first probe 27a of the reagent arm 26 and a position at which a reagent is collected through the first probe 27a. After sucking a predetermined reagent, the first probe 27a dispenses the sucked reagent to the separating device 50 installed in the dispensing port 32, thereby adding the reagent to a sample. In addition, a diluent for diluting a sample is installed in the reagent installing portion 8. When dilution is necessary for a pretreated sample, the first probe 27a sucks and mixes the diluent with a predetermined amount of a sample to dilute the sample.

A pretreating container installing portion 12 is provided at a position different from those of the sample installing portion 2 and the reagent installing portion 8. In the pretreating container installing portion 12, a plurality of sets of the pretreating containers in a state where an unused separating device 50 and collecting container 54 are stacked are annularly arranged. The pretreating container installing portion 12 rotates in a horizontal plane to move the pretreating container in a circumferential direction and arranges any one set of the pretreating containers at a position along the trajectory of the holding portion 25 of the transferring arm 24. The transferring arm 24 can hold the unused separating device 50 or collecting container 54 arranged at a position along the track of the holding portion 25.

In the pretreating container installing portion 12, an analyst can install plural kinds (for example, two kinds) of separating devices 50 provided with separating agents having different separating performances. These separating devices 50 are selectively used depending on analytic items for a sample, and the separating device 50 corresponding to the analytic item specified by an analyst is selected by the pretreating container installing portion 12. Selection of the appropriate separating device 50 is performed by a controlling portion that controls operation of the pretreating apparatus 1. The controlling portion is described later. The analytic item here is a type of analysis to be continuously performed using a sample pretreated by the pretreating apparatus 1. Examples of the analyzing apparatus that performs such an analysis include a liquid chromatography apparatus (LC) or a liquid chromatograph-mass spectrometer (LC/MS).

A description is made of the separating device 50 and the collecting container 54 constituting the pretreating container with reference to FIGS. 2A, 2B, 2C and 2D.

Figure 2A:
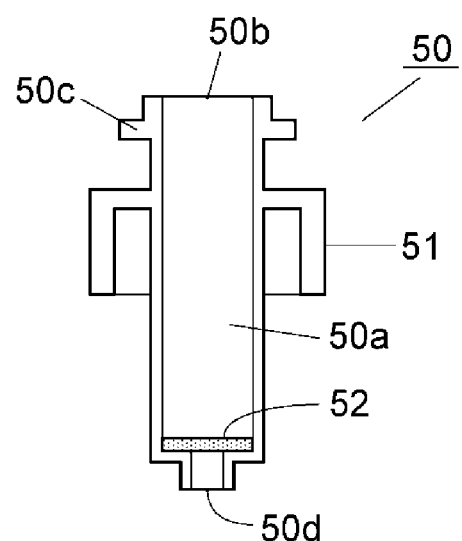
FIG. 2A is a cross-sectional view showing an example of a separating device of a pretreating container.

As shown in FIG. 2A, the separating device 50 is a cylindrical container having an internal space 50*a* for storing a sample or reagent. A separating layer 52 is provided at the bottom portion of the internal space 50*a*. The separating layer 52 is a separating agent or a separating membrane having a function of allowing a sample to pass therethrough and physically or chemically reacting with a specific component in the sample, thereby selectively separating the specific component. As the separating agent constituting the separating layer 52, for example, an ion exchange resin, silica gel, cellulose, activated carbon, or the like can be used. As the separating membrane, a PTFE (polytetrafluoroethylene) membrane, nylon membrane, polypropylene membrane, PVDF (polyvinylidene fluoride) membrane, acrylic copolymer membrane, mixed cellulose membrane, nitrocellulose membrane, polyethersulfone membrane, ion exchange membrane, glass fiber membrane, or the like can be used.

In addition, as a deproteinizing filter (separating membrane) for removing protein in a sample through filtration, a PTFE, acrylic copolymer film, or the like can be used. In this case, in order to prevent clogging in the deproteinizing filter, a prefilter 52*b* may be provided over the deproteinizing filter 52*a*, as shown in FIG. 2D. As the prefilter 52*b*, a nylon membrane, polypropylene membrane, glass fiber membrane, or the like can be used. The prefilter 52*b* is for removing insoluble substances or foreign substances having a relatively large particle diameter from a sample. This makes it possible to prevent the deproteinizing filter 52*a* from being clogged with insoluble substances or foreign substances having a relatively large particle diameter.

An opening 50*b* through which a sample or reagent is injected is provided through the upper surface of the separating device 50, and an extracting port 50*d* through which liquid having passed through the separating agent 52 is extracted is provided through the lower surface thereof. A flange portion 50*c* protruding in a circumferential direction is provided around the upper portion of the outer peripheral surface to engage the holding portion 25 of the transferring arm 24 described later.

Below the flange portion 50*c*, a skirt portion 51 projecting in a circumferential direction and extending downwardly therefrom by a predetermined distance to surround the outer circumferential surface is provided. As described later, when the skirt portion 51 is housed together with the collecting container 54 in a filtrating port 30 of a treating portion 28, the skirt portion 51 is brought into close contact with the edge of the filtrating port 30 so as to make a space inside the skirt portion 51 as a sealed space.

Figure 2B:
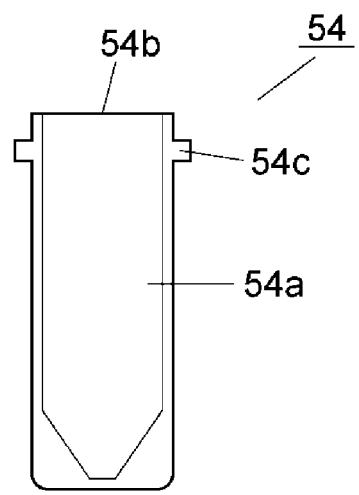
FIG. 2B is a cross-sectional view showing an example of a collecting container of a pretreating container.
Figure 2C:
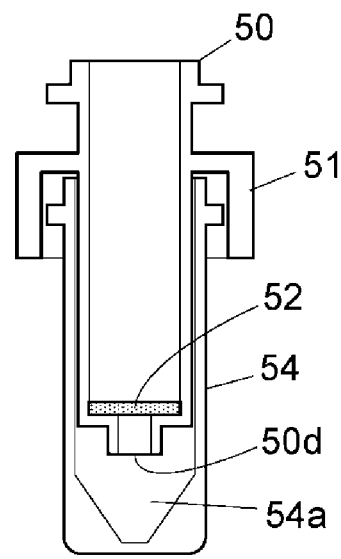
FIG. 2C is a cross-sectional view showing a pretreating container in a state where a collecting container is attached to a separating device.
Figure 2D:
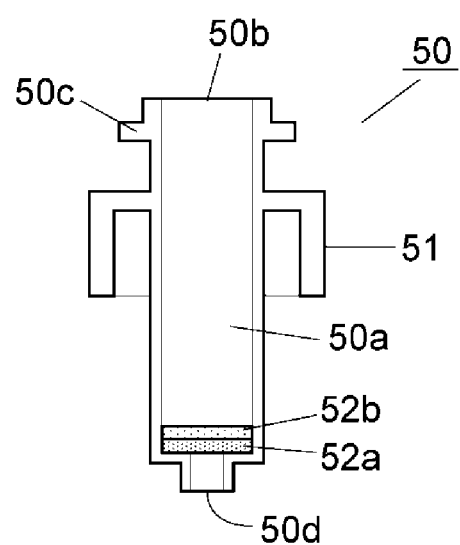
FIG. 2D is a cross-sectional view showing another example of a separating device.

As shown in FIGS. 2B and 2C, the collecting container 54 is a cylindrical container for housing the lower portion of the separating device 50 and recovering an extracted solution extracted through the extracting port 50*d* of the separating device 50. The upper surface has an opening 50*b* through which the lower portion of the separating device 50 is inserted, and the inner portion has a space 54*a* in which a portion of the separating device 50 below the skirt portion 51 is housed. Similarly to the separating device 50, a flange portion 54*c* protruding in a circumferential direction is provided around the upper portion of the outer peripheral surface to engage the holding portion 25 of the transferring arm 24. The flange portion 54*c* has the same shape and outer diameter as those of the flange portion 50*c* of the separating device 50. The holding portion 25 of the transferring arm 24 can hold the flange portion 50*c* of the separating device 50 and the flange portion 54*c* of the collecting container 54 in the same manner.

When attached to the separating device 50, the upper portion of the collecting container 54 enters the inside of the skirt portion 51. The outer diameter of the separating device 50 and the inner diameter of the collecting container 54 are designed to provide a small gap between the outer peripheral surface of the separating device 50 and the inner peripheral surface of the collecting container 54 when the separating device 50 is housed in the inner space 54*a* of the collecting container 54. In the pretreating container installing portion 12, the separating device 50 and the collecting container 54 are installed in a state (the state of FIG. 2C) where the lower portion of the separating device 50 is housed in the collecting container 54.

Figure 3:
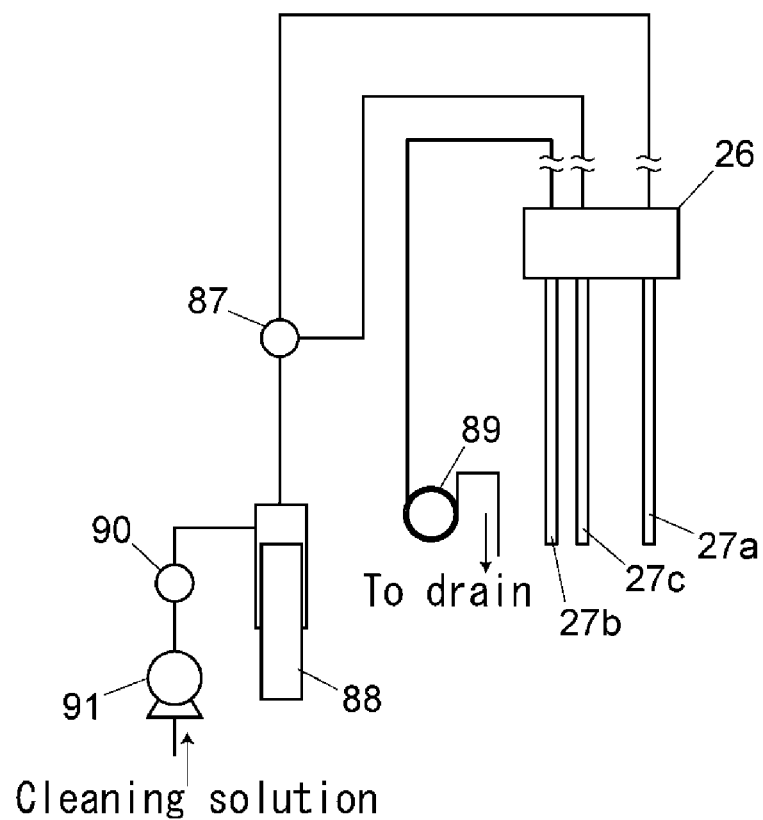
FIG. 3 is a schematic configurational flow path diagram showing an example of a flow path configuration of a probe in the embodiment.

Here, a description is made of the configuration of flow paths connected to the probes 27*a*, 27*b* and 27*c* with reference to FIG. 3.

The base end of the first probe 27*a* is connected to the syringe pump 88 via a three-way valve 87 in such a way that liquid can be sucked or discharged through the tip of the first probe 27*a*. The base end of the second probe 27*b* is connected to a peristaltic pump 89 in such a way that liquid can be sucked through the tip of the second probe 27*b*. The base end of the third probe 27*c* is connected to the syringe pump 88 via the three-way valve 87. A pump 91 for supplying a cleaning solution is connected to a cylinder of the syringe pump 88 via a solenoid valve 90. By doing so, the cleaning solution can be discharged through the tips of the first probe 27*a* and the third probe 27*c*.

The second probe 27*b* and the third probe 27*c* are disposed close to each other, and the first probe 27*a* is disposed apart from the probes 27*b* and 27*c*. By doing so, during diluting operation described later, shifting a lowered position of a reagent probe 26 makes it possible to bring into a state where the first probe 27*a* is singly inserted into the collecting container 54 separately from the other probes 27*b* and 27*c*, or a state where two probes of the second probe 27*b* and the third probe 27*c* can be simultaneously inserted into the same collecting container 54.

By means of the configuration as shown in FIG. 3 and a diluting unit of the controlling portion 84 described later, a diluting portion for diluting a pretreated sample is embodied. Note that a configuration for embodying the diluting portion is not limited to that including the configuration of FIG. 3, but may be those including modifications of FIGS. 10 to 13 described later.

Returning to FIG. 1, a description is continued. As ports of the pretreating portion for housing the pretreating container and performing specific pretreating items, the filtrating port 30, a stirring port 36*a*, a temperature controlling port 38 for the separating device 50 and a temperature controlling port 40 for the collecting container 54 are provided. The filtrating ports 30 are provided at two positions inside the pretreating container installing portion 12. Three stirring ports 36a are provided in a stirring portion 36 provided in the vicinity of the pretreating container installing portion 12. The temperature controlling ports 38, 40 are arranged side by side on a circular arc. A diluting port 41 is provided adjacent to the temperature controlling port 40.

A negative pressure loading mechanism 55 is connected to the filtrating port 30 (see FIGS. 4A and 4B), so as to apply a negative pressure to the pretreating container installed in the filtrating port 30. The filtrating port and the negative pressure loading mechanism 55 constitute a pretreating portion for performing filtration of a sample as a pretreatment. The stirring portion 36 also constitutes the pretreating portion. The stirring portion 36 has a mechanism for periodically operating the stirring ports 36a individually in a horizontal plane, by which a sample solution in the separating device 50 placed in each of the stirring ports 36a is stirred. The temperature controlling ports 38 and 40 also constitute the pretreating portion. They are provided on a thermally conductive block whose temperature is controlled by, for example, a heater and a Peltier element, and house the separating device 50 or the collecting container 54 to adjust the temperature of the separating device 50 or the collecting container 54 to a constant temperature.

A description is made of the filtrating port 30 with reference to FIGS. 4A, 4B, 4C and 4D.

Figure 4A:
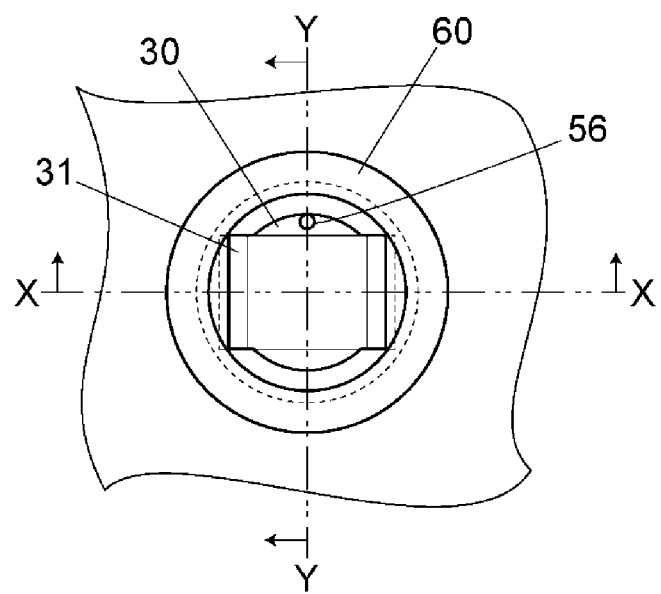
FIG. 4A is a plan view showing a filtrating port.

The filtrating port 30 is a recessed portion for housing the pretreating container. As shown in FIG. 4D, the collecting container 54 is first housed in the filtrating port 30, and the lower portion of the separating device 50 is housed in the inner space 54a of the collecting container 54.

Figure 4B:
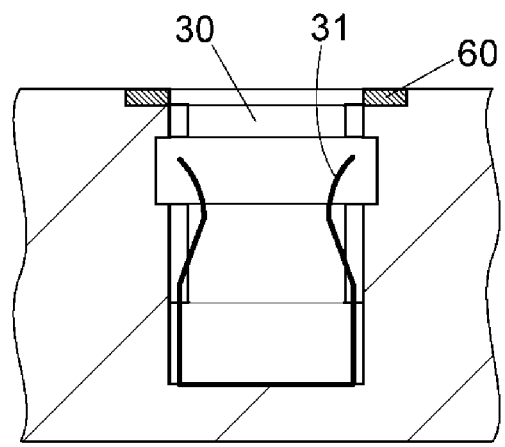
FIG. 4B is a cross-sectional view taken along line X-X in FIG. 4A.
Figure 4C:
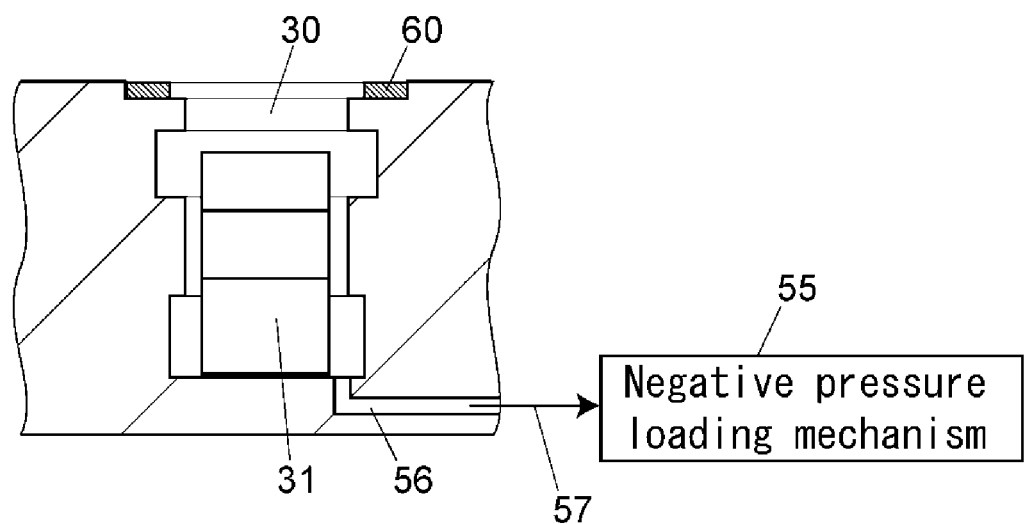
FIG. 4C is a cross-sectional view taken along line Y-Y in FIG. 4A.
Figure 4D:
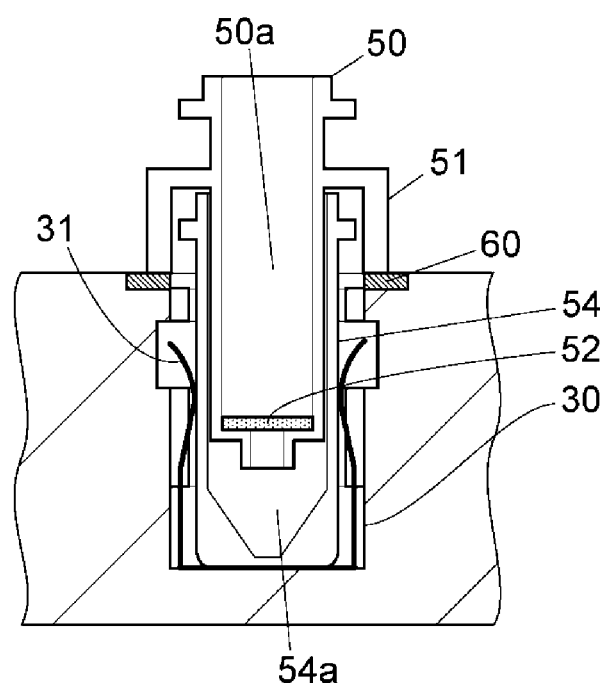
FIG. 4D is a cross-sectional configurational diagram showing a state where a pretreating container is installed in a filtrating port.

In the filtrating port 30, a collecting container holding member 31 is provided for holding at the central portion the collecting container 54 by evenly pressing the collecting container 54 from opposite two directions so as to clamp the collecting container 54 (see FIGS. 4B and 4D). The collecting container holding member 31 is a U-shaped metal member having an opening at the upper portion, and constitutes two plate springs configured in such a way that two upwardly extending arms are elastically displaced in an inner diameter direction of the filtrating port 30. The two plate spring portions of the collecting container holding member 31 have a curved or bent shape which is inwardly recessed in such a way that the space between portions each of which is between the upper end portion and the lower end portion becomes narrowest. The space between the two plate spring portions at the upper end portion and the lower end portion is wider than the outer diameter of the collecting container 54, but that at the narrowest portion is narrower than the outer diameter of the collecting container 54. According to the shape of the collecting container holding member 31, when the collecting container 54 is inserted into the filtrating port 30, the two plate spring portions of the collecting container holding member 31 are opened, as the collecting container descends, and the generated elastic force allows the collecting container 54 to be held at the central portion of the filtrating port 30. The collecting container holding member 31 is fixed in the filtrating port 30, and thus, is not lifted up together with the collecting container 54 when the collecting container 54 is taken out.

A ring-shaped sealing member 60 having elasticity is provided on the edge of the upper opening portion of the filtrating port 30. The sealing member 60 is fitted into a recess disposed around the edge of the upper opening portion of the filtrating port 30. The material of the sealing member 60 is an elastic material such as silicone rubber or EPDM (ethylene-propylene-diene rubber). When the collecting container 54 and the separating device 50 are installed in the filtrating port 30, the lower end of the skirt portion 51 of the separating device 50 comes into contact with the sealing member 60, and then a surrounded space by the inner side surface of the skirt portion 50 and the inner side surface of the filtrating port 30 is sealed.

A flow path 56 for depressurization communicates with the bottom surface of the filtrating port 30 (see FIGS. 4A and 4C). A flow path 57 of the negative pressure loading mechanism 55 is connected to the flow path 56. The specific configuration of the negative pressure loading mechanism 55 is described later. The negative pressure loading mechanism 55 applies a negative pressure toward the filtrating port 30 by a vacuum pump.

In a state where the separating device 50 and the collecting container 54 are housed in the filtrating port 30, reducing the pressure in the filtrating port 30 by the negative pressure loading mechanism 55 brings into a negative pressure in the space surrounded by the inner side surface of the skirt portion 50 and the inner side surface of the filtrating port 30. The internal space 54a of the collecting container 54 communicates with a space in which the pressure has become negative. Because the upper surface of the separating device 50 is open to the atmosphere, a pressure difference is generated between the internal space 50a of the separating device 50 and the internal space 54a of the collecting container 54 via the separating agent 52. Accordingly, out of the sample solution stored in the internal space 50a of the separating device 50, only components capable of passing through the separating agent 52 are extracted toward the internal space 54a of the collecting container 54 due to the pressure difference.

Figure 5:
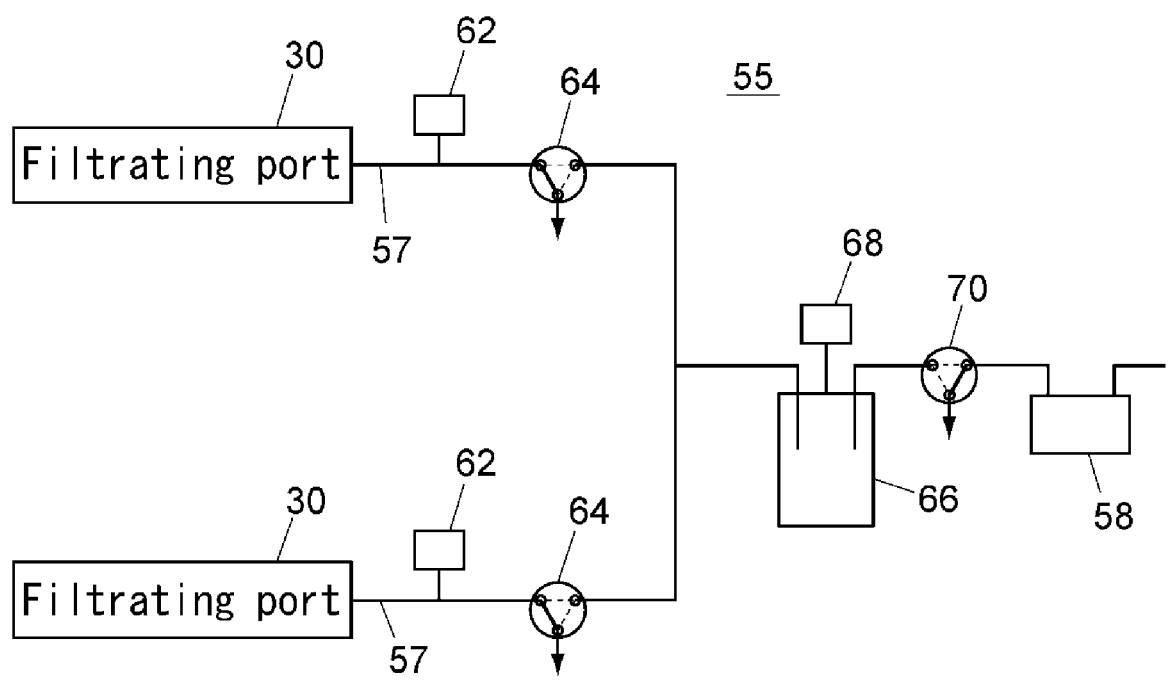
FIG. 5 is a schematic flow path configurational diagram showing a configuration of a negative pressure loading mechanism.

An example of the negative pressure loading mechanism 55 is shown in FIG. 5.

Two filtrating ports 30 are connected to a common vacuum tank 66. Each of the flow paths 57 connecting the filtrating ports 30 and the vacuum tank 66 includes a pressure sensor 62 and a three-way valve 64. The pressure in the filtrating port 30 is detected by the pressure sensor 62. The three-way valve 64 is in a state where the filtrating port 30 is connected to the vacuum tank 62, a state where one of the flow paths 57 on the side of the filtrating port 30 is open to the atmosphere (the state in the corresponding figure), or a state where the end portion of one of the flow paths 57 on the side of the filtrating port 30 is sealed.

A pressure sensor 68 is connected to the vacuum tank 66, and a vacuum pump 58 is connected thereto via a three-way valve 70. A vacuum pump 58 can be connected to the vacuum tank 66, as necessary, to adjust the pressure in the vacuum tank 66.

When extracting a sample in any of the filtrating ports 30, the filtrating port 30 is connected to the vacuum tank 66, the value of the pressure sensor 62 for detecting the pressure in the filtrating port 30 is adjusted to a predetermined value, and then the end portion of one of the flow paths 57 on the side of the filtrating port 30 is sealed. By doing so, the inside of the filtrating port 30 becomes a sealed system and the reduced pressure state in the filtrating port 30 is maintained, so that the sample is extracted.

Figure 6A:
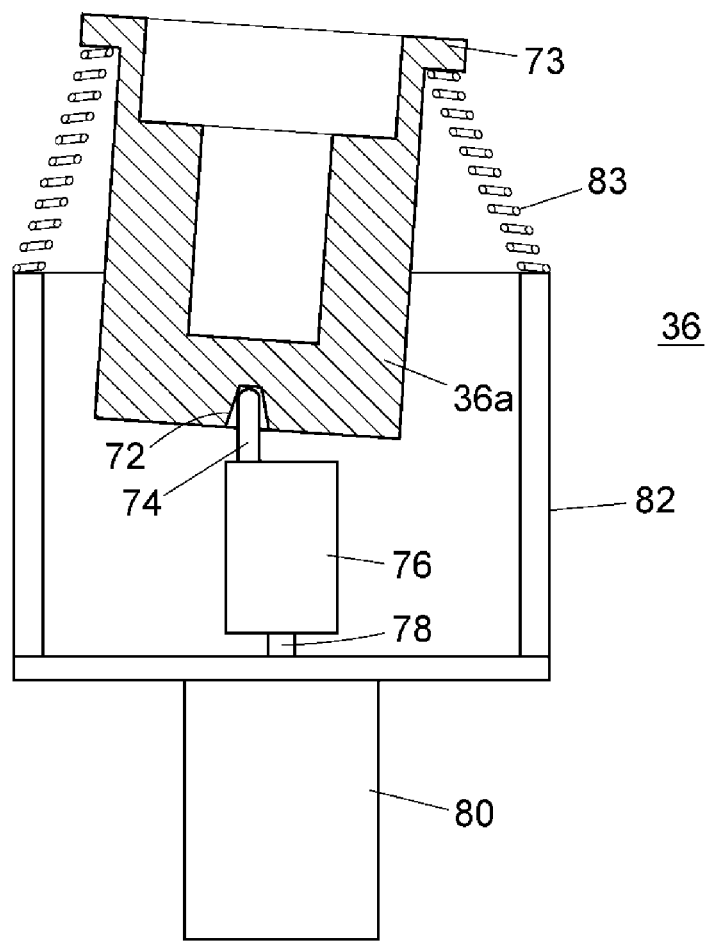
FIG. 6A is a cross-sectional configurational diagram showing a structure of a stirring portion.
Figure 6B:
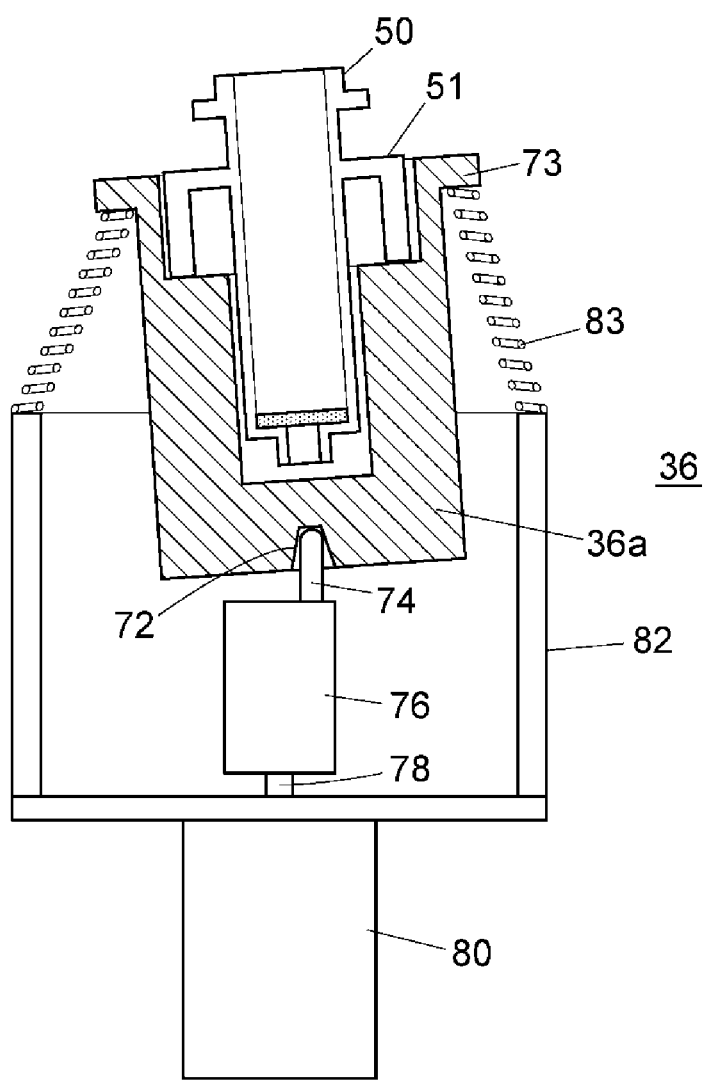
FIG. 6B is a cross-sectional configurational diagram showing an operation state of a stirring portion.

Next, a description is made of the structure of the stirring portion 36 with reference to FIGS. 6A and 6B. FIGS. 6A and 6B show one stirring port 36a of the stirring portion 36.

The stirring port 36a of the stirring portion 36 is a container for housing the separating device 50. The stirring port 36a is driven by a stirring mechanism provided below the stirring port 36a.

A description is made of the stirring mechanism for driving the stirring port 36a. A rotating body 76 is disposed below the stirring port 36a, and a driving shaft 74 disposed vertically is attached to a position shifted from the center of the upper surface of the rotating body 76. The upper end of the driving shaft 74 is inserted into a supporting hole 72 provided on the lower surface of the stirring port 36a. The rotating body 76 is supported by a rotating shaft 78 which is rotated by a motor 80, and the rotating body 76 is rotated by driving of the motor 80, so that the driving shaft 74 turns in a horizontal plane accordingly.

A supporting frame 82 is attached to the motor 80. The supporting frame 82 has a side wall extending vertically upward from the side of the motor 80, and one end of elastic members 83 such as coil springs is attached to the upper end of the side wall. The other end of the elastic members 83 is attached to the upper outer surface of the stirring port 36a, thereby elastically holding the upper portion of the stirring port 36a. The elastic members 83 are disposed at a plurality of uniform positions (for example, four positions) around the stirring port 36a.

When the motor 80 is driven in a state where the separating device 50 storing a sample and a reagent is housed in the stirring port 36a, as shown in FIG. 6B, the driving shaft 74 turns in a horizontal plane, so that the lower end portion of the collecting container 72 turns accordingly. By doing so, the inside of the separating device 50 housed in the stirring port 36a is stirred, and the sample and the reagent are mixed.

Returning to FIG. 1, the pretreating apparatus 1 includes, on the side edge portion of the casing, a sample transferring apparatus 42 for transferring a sample extracted in a collecting container 54 toward a sample injecting apparatus (e.g., an autosampler or the like) disposed adjacent to the pretreating apparatus 1. The sample transferring apparatus 42 is provided with a moving portion 44 which moves in one direction (the direction of the arrow in FIG. 1) in a horizontal plane by a driving mechanism having a rack and pinion mechanism. In the upper surface of the moving portion 44, a transferring port 43 is provided for installing a collecting container 54 storing an extracted sample.

When a sample is not transferred toward the sample injecting apparatus, the transferring port 43 is placed at a position along the trajectory of the holding portion 25 of the transferring arm 24 (the position indicated by the solid line in the figure), and at this position, installation of the collecting container 54 to the transferring port 43 by the transferring arm 24 and recovery of the collecting container 54 from the transferring port 43 are performed.

When a sample is transferred toward the sample injecting apparatus, the collecting container 54 storing the extracted sample is installed in the transferring port 43, and subsequently, the moving portion 44 moves in an outer side direction of the pretreating apparatus 1, so that the transferring port 43 is placed at a position (the position indicated by the dashed line in the figure) on the side of the adjacent sample injecting apparatus. At this position, a sampling nozzle provided on the sample injecting apparatus sucks the sample in the collecting container 54. Upon completion of the sample sucking by the sample injecting apparatus, the moving portion 44 returns to the original position (the position indicated by the solid line in the figure), and collecting container 54 is recovered by the transferring arm 24. The used collecting container 54 is transferred to the discarding port 34 by the transferring arm 24 to be discarded.

The pretreating apparatus 1 includes a discarding port 34 for discarding the used separating device 50 and collecting container 54 at a position along the trajectory of the holding portion 25 of the transferring arm 24 in the vicinity of the dispensing port 32. In addition, a cleaning port 45 for cleaning the sampling nozzle 20a is provided at a position along the trajectory of the sampling nozzle 20a. Although not shown, a cleaning port for cleaning the first probe 27a is provided at a position along the trajectory of the first probe 27a.

Figure 7:
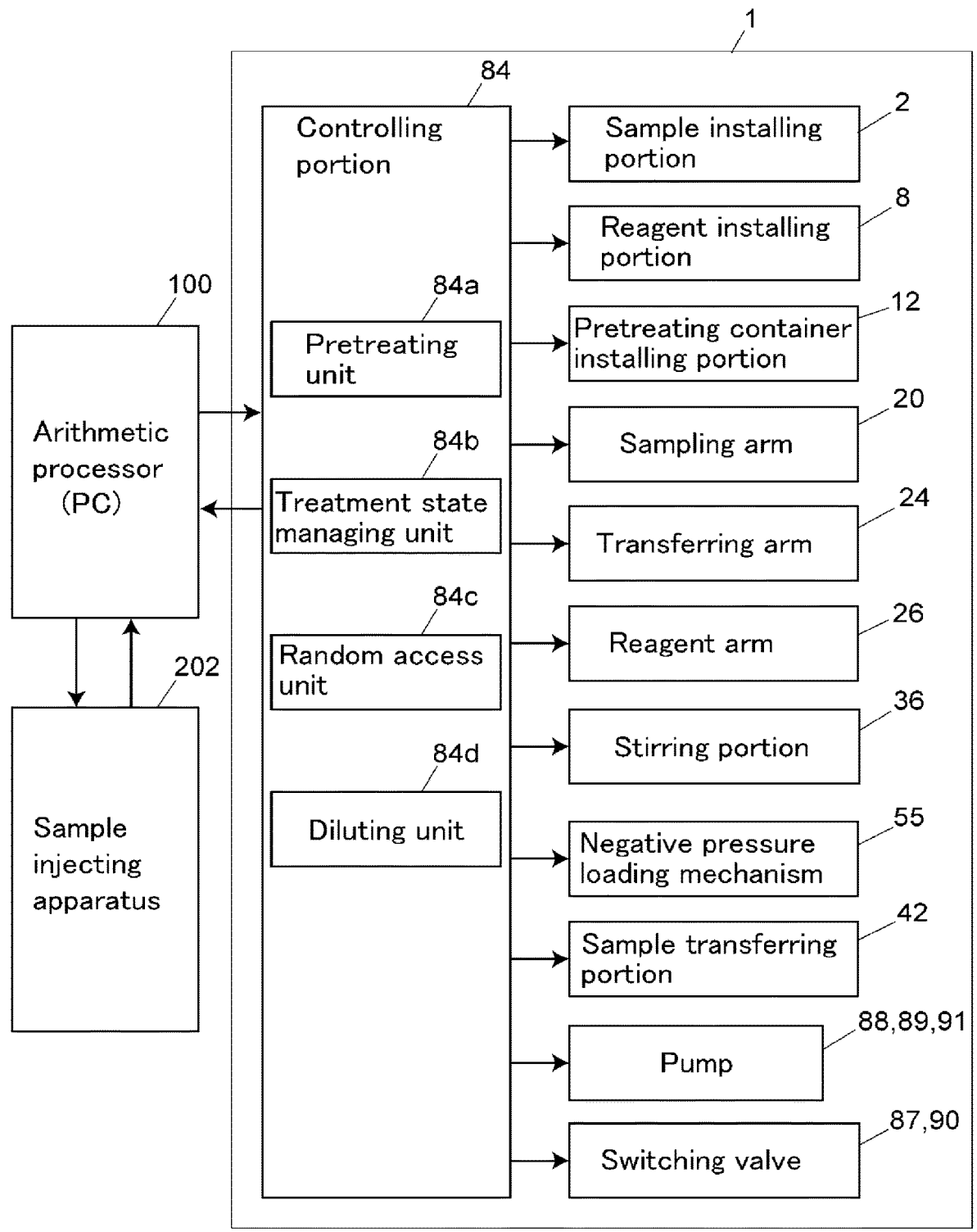
FIG. 7 is a block diagram showing a control system of the embodiment.

Next, a description is made of the controlling system of the pretreating apparatus 1 with reference to FIG. 7. In the following description, a "port" means any one of the filtrating port 30, dispensing port 32, stirring port 36a, temperature controlling ports 38, 40, and transferring port 43, in which the separating device 50 or the collecting container 54 is installed.

Operation of the sample installing portion 2, reagent installing portion 8, pretreating container installing portion 12, sampling arm 20, transferring arm 24, reagent arm 26, stirring portion 36, sample transferring apparatus 42, negative pressure loading mechanism 55, pumps 88, 89, (see FIG. 3), and switching valves 87, 90 (see FIG. 3) provided on the pretreating apparatus 1 is controlled by the controlling portion 84. The controlling portion 84 is embodied by a computer provided in the pretreating apparatus 1 and software executed by the computer. An arithmetic processor 86 embodied by, for example, a personal computer (PC) or a dedicated computer is connected to the controlling portion 84, and an analyst manages the pretreating apparatus 1 via the arithmetic processor 86. The arithmetic processor 86 is electrically connected to a liquid chromatograph system (hereinafter, an LC system) 200 (see FIGS. 13 and 14), which is arranged adjacent to the pretreating apparatus 1, for analyzing a sample which has been pretreated by the pretreating apparatus 1, by which a sample injecting apparatus 202 provided on the LC system 200 associates with the operation of the pretreating apparatus 1. In FIG. 7, only the sample injecting apparatus 202 of the LC system 200 is shown.

The controlling portion 84 includes a pretreating unit 84a, a treatment state managing unit 84b, a random access unit 84c, and a diluting unit 84d. Each of these units has a function obtained when the computer constituting the controlling portion 84 executes software. As described above, a plurality of sample containers are installed in the sample installing portion 2, and samples stored in the sample containers are sequentially dispensed to the separating devices 50 to be transferred to a port corresponding to the pretreating item to be performed on the samples.

The random access unit 84c is configured to check the treating item to be performed next on each of the samples, check the availability of a port corresponding to the treating item, and, if the port is available, transfer the separating device 50 or collecting container 54 storing the sample to the available port. On the other hand, if the port corresponding to the treating item is not available, as soon as the port becomes available, it transfers the target separating device 50 or collecting container 54 to the available port. The random access unit 84c is configured to check the state of treatment at each port and control the transferring arm 24 so as to transfer the separating device 50 which has completed the treatment at the port to a port at which the next treatment is to be performed.

The treatment state managing unit 84b is configured to manage the availability of each port and the state of treatment at each port. The availability of each port can be managed by storing in which port the separating device or the collecting container 54 is installed. In addition, a sensor for detecting whether or not the separating device 50 or the collecting container 54 is installed in each port may also be provided to manage the availability of each port based on a signal from the sensor. The state of treatment at each port can be managed depending on whether or not the time required for treatment performed at the port has elapsed from installation of the separating device 50 or the collecting container 54 in the port. The state of treatment (sample sucking by the sample injecting apparatus 202) at the transferring port 43 may also be managed depending on whether or not a signal indicating that sample sucking has completed has been received from the sample injecting apparatus 202.

When installed in each port, the separating device 50 or the collecting container 54 is configured to perform a predetermined treatment at the port.

Here, a plurality of filtrating ports 30, stirring ports 36a, and temperature controlling ports 38, 40 are each provided, in which these ports provided for executing the same treatment have set priority, by which the random access unit 84c is configured to use ports in order from one having higher priority. For example, when filtration of a sample is performed, if both of the two filtrating ports 30 are available, the collecting container 54 is installed in a filtrating port 30 having higher priority, and then the separating device 50 is put on the installed collecting container 54.

When dilution is necessary for a pretreated sample, the diluting unit 84d is configured to control operation of the transferring arm 24, reagent arm 26, pumps 88, 89, 91, and switching valves 87, 90 so as to install the collecting container 54 in the diluting port 41 and perform predetermined diluting operation.

Figure 8:
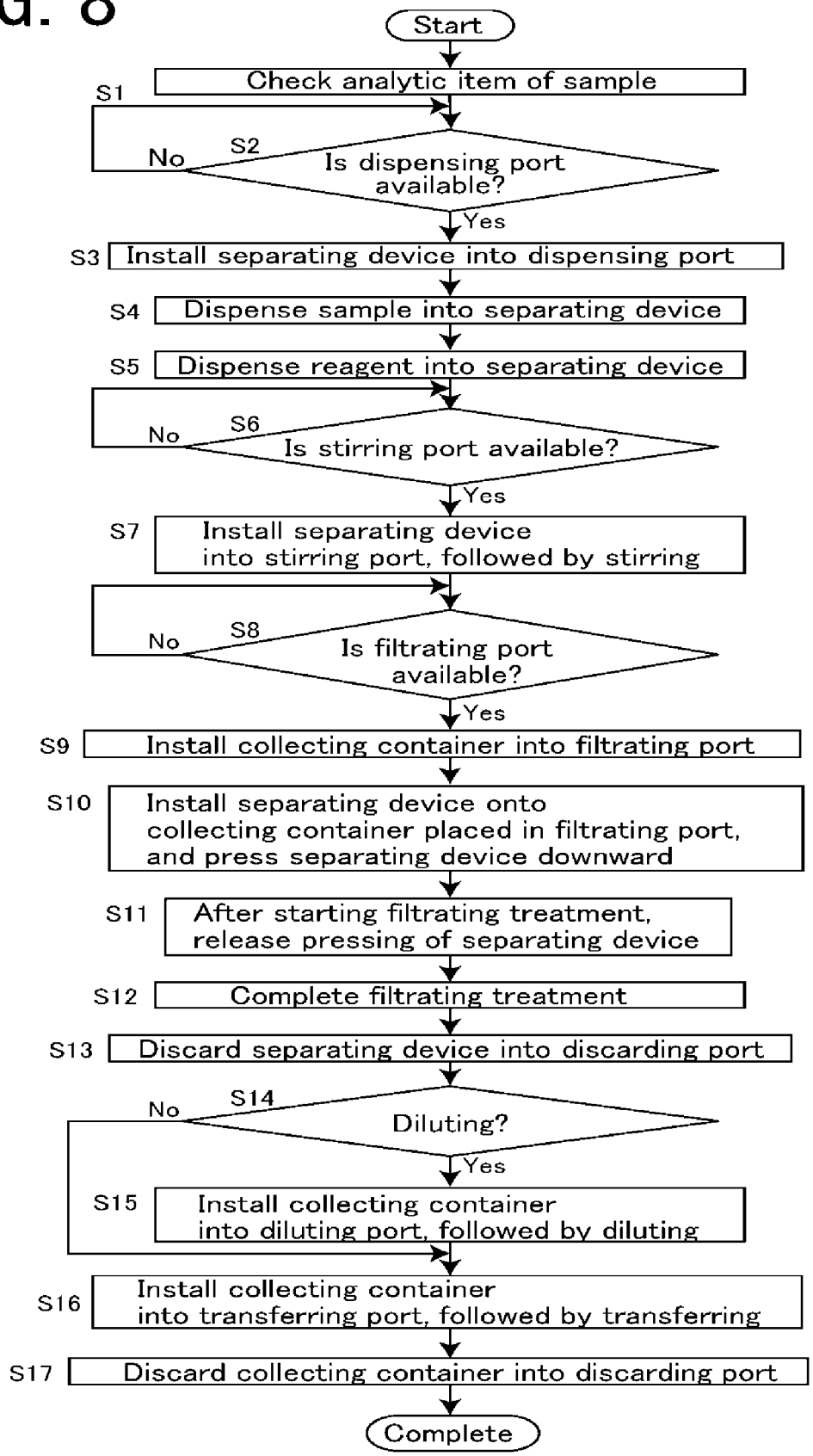
FIG. 8 is a flowchart showing an example of pretreating operation of the embodiment.

An example of pretreating operation for one sample of this embodiment is described with reference to FIG. 1 together with the flowchart of FIG. 8. The flowchart of FIG. 8 shows only the flow of pretreatment for one sample, and operation of this pretreatment is performed concurrently with and independently of pretreating operation of the other samples. "Performing the pretreatment concurrently and independently" means that while the filtrating treatment or stirring treatment is being performed on a certain sample in a port such as the filtrating port 30 or the stirring port 36a, the transferring arm 24 transfers the separating device 50 or the collecting container 54 storing another sample to another port and independently performs the treatment on the other sample.

First, an analytic item previously specified by an analyst for a sample is checked (step S1), and a pretreating item necessary for performing the analytic item is determined. Whether or not the dispensing port 32 is available is checked. If the dispensing port 32 is available, the transferring arm 24 takes out an unused separating device 50 for storing the sample from the pretreating container installing portion 12 and installs it in the dispensing port 32 (steps S2 and S3). The separating device 50 and the collecting container 54 are installed in the pretreating container installing portion in an overlapped state (the state of FIG. 2C). The transferring arm 24 holds only the upper separating device by the holding unit 25 and transfers it to the dispensing unit 32.

The sample is dispensed into the separating device 50 through the sampling nozzle 20a (step S4). The sampling nozzle 20a which has dispensed the sample into the separating device 50 subsequently undergoes cleaning at the cleaning port 45 to be ready for dispensing of the next sample. From the reagent container 10 through the reagent dispensing nozzle 26a, a reagent corresponding to the pretreatment to be performed on the sample dispensed in the separating device 50 is collected and dispensed in the separating device 50 in the dispensing port 32 (step S5). Note that dispensing of the reagent in the separating device 50 may be performed before dispensing the sample. In addition, a reagent dispensing port for dispensing a reagent may be disposed at a position different from that of the dispensing port 32, a separating device 50 may be installed in the reagent dispensing port by the transferring arm 24, and at that position, dispensing of the reagent may be performed.

After dispensing the sample and the reagent in the separating device 50, the availability of the stirring port 36a is checked (step S6). If the stirring port 36a is available, the separating device 50 placed in the dispensing port 32 is installed in the available stirring port 36a by the transferring arm 24 to perform stirring (step S7). This stirring treatment is performed for a predetermined fixed period of time, so that the sample and the reagent in the separating device 50 are mixed. During this stirring treatment, the availability of the filtrating port 30 is checked (step S8). If the filtrating port 30 is available, the collecting container 54 is installed in the filtrating port 30 by the transferring arm 24 (step S9). The collecting container 54 installed in the filtrating port 30 is a collecting container 54 to be paired with the separating device 50 that is during stirring in the stirring port 36a, and is a collecting container 54 that used to be installed in the pretreating container installing portion 12 in an overlapped state with the separating device 50 that is during stirring. Note that during this stirring treatment, the transferring arm 24 can also transfer a separating device 50 or a collecting container 54 for another sample.

Upon completion of the stirring treatment in the stirring portion 36, the transferring arm 24 transfers the separating device 50 to the filtrating port 30, and installs the separating device 50 on the collecting container 54 in such a way that the lower portion of the separating device 50 is housed in the collecting container 54 installed in the filtrating port 30 (in the state of FIG. 4B, step S10). At this time, the separating device 50 is pressed downward (to the side of the filtrating port 30), to lower the lower end of the skirt portion 51 of the separating device 50 so as to be slightly (for example, about 0.1 mm) lower than the height of the upper surface of the sealing member 60 provided around the filtrating port 30. By doing so, the lower end of the skirt portion 51 of the separating device 50 crushes the sealing member 60, thereby improving the airtightness between the lower end of the skirt portion 51 and the sealing member 60. The transferring arm 24 maintains a state where the separating device 50 is pressed downward, until the filtrating treatment described below is started and the inside of the filtrating port 30 has a negative pressure.

The separating device 50 is installed on the collecting container 54 in the filtrating port 30 to bring the inside of the filtrating port 30 into an airtightly sealed state to start filtrating treatment. In the filtrating treatment, the inside of the filtrating port 30 is depressurized by the negative pressure loading mechanism 55 in such a way that the inside of the filtrating port 30 housing the separating device 50 and the collecting container 54 has a negative pressure. The inside of the filtrating port 30 is kept under a negative pressure for a certain period of time, so that a sample in the separating device 50 is filtrated and is extracted in the collecting container 54 (step S11).

After the filtrating treatment is started, when the pressure sensor 62 (see FIG. 5) detects that the pressure in the filtrating port 30 reaches a negative pressure, the transferring arm 24 releases the downward pressing of the separating device 50 and the holding of the separating device 50. The transferring arm 24 which has released the holding of the separating device 50 can transfer another separating device 50 or collecting container 54. It is not always necessary to perform the releasing of the downward pressing of the separating device 50 and the holding of the separating device 50 by the transferring arm 24 only based on the detection signal from the pressure sensor 62, but the releasing may be done after the filtrating treatment is started and then a predetermined time elapses.

Note that although not incorporated in this pretreating operation, a temperature treatment of placing a sample in the separating device 50 at a constant temperature for a certain period of time after the sample in the separating device 50 is stirred may be incorporated. In this case, after completion of the stirring treatment, the availability of the temperature controlling port 40 is checked, and if the port is available, the separating device 50 is installed in the available temperature controlling port 38. After a certain period of time elapses, the separating device 50 placed in the temperature controlling port 38 is installed on the collecting container 54 placed in the filtrating port 30.

After completion of the filtrating treatment for a sample (step S12), the three-way valve 64 (see FIG. 5) is switched to bring the inside of the filtrating port 30 into the atmospheric pressure, and the used separating device 50 is taken out from the filtrating port 30 by the holding portion 25 of the transferring arm 24 to discard it into the discarding port 34 (step S13).

Thereafter, if it is set to dilute the sample (step S14), the availability of the diluting port 41 is checked, and if the port is available, the collecting container 54 is installed in the diluting port 41 by the transferring arm 24 and predetermined diluting operation is performed (step S15). The diluting operation is described later.

After completion of the dilution of the sample, the availability of the transferring port 43 is checked, and if the transferring port 43 is available, the collecting container 54 storing the diluted sample is installed into the transferring port 43 by the transferring arm 24. When the collecting container 54 is installed in the transferring port 43, the moving portion 44 moves to a position (the position indicated by the dashed line in FIG. 1) on the side of the sample injecting apparatus 202 provided on the LC system 200 (see FIGS. 14 and 15) which is disposed adjacent to the moving portion 44, so that the collecting container 54 is transferred toward a sample sucking apparatus 90.

On the side of the sample injecting apparatus 202, sucking the sample from the collecting container 54 transferred by the transferring apparatus 42 is performed through the sampling nozzle. The moving portion 44 stops at a position on the side of the LC system 200 until the sample sucking from the sample injecting apparatus 202 is completed and then, when receiving a signal indicating that the sample sucking has been completed from the LC system 200, goes back to the original position (the position indicated by the solid line in FIG. 1).

After completion of the transfer of the sample, the used collecting container 54 is recovered from the transferring port 43 by the transferring arm 24, to be discarded into the discarding port 34 (step S17).

Note that after completion of the filtrating treatment for the sample, a temperature treatment of placing the extracted sample in the collecting container 54 at a constant temperature for a certain period of time may be performed. In this case, the availability of the temperature controlling port 40 is checked, and if the port is available, the collecting container 54 is installed in the available temperature controlling port 40. After a certain period of time elapses, the collecting container 54 placed in the temperature controlling port 40 is installed in the transferring port 43 to transfer the sample.

Figure 9:
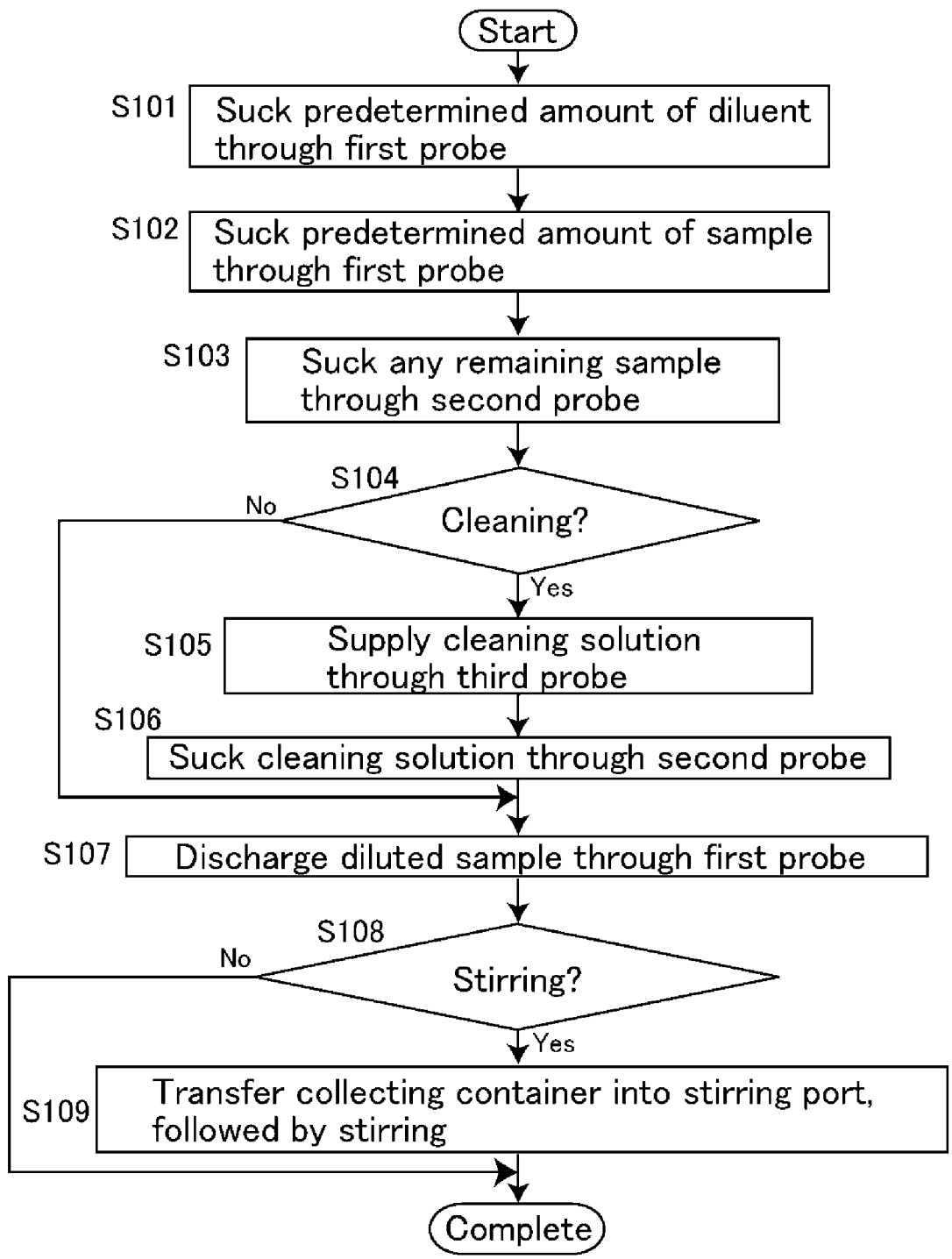
FIG. 9 is a flowchart showing an example of diluting operation of the embodiment.

Next, a description is made of an example of diluting operation for a pretreated sample with reference to FIGS. 1 and 3 together with the flowchart of FIG. 9.

Before or after installing the collecting container 54 storing the pretreated sample in the diluting port 41, first, a predetermined amount of diluent is sucked from a diluent container installed in the reagent installing portion 8 through the tip of the first probe 27a (Step S101). Subsequently, only the first probe 27a is inserted into the collecting container 54 installed in the diluting port 41, to suck a predetermined amount of sample (step S102). The sucking amounts of diluent and sample are determined by a predetermined dilution ratio. The sucked diluent and sample are mixed in the first probe 27a and in a piping connected to the first probe 27a.

Next, the second probe 27b and the third probe 27c are inserted simultaneously into the collecting container 54 by shifting the position of the reagent probe 26 to suck any sample remaining in the collecting container 54 through the tip of the second probe 27b and discharge it into a drain (step S103). Here, in case of cleaning the collecting container 54 (step S104), a cleaning solution is supplied through the third probe 27c (step S105) to suck the cleaning solution through the second probe 27b (step S106). This cleaning operation may be repeated a plurality of times.

A mixed solution (diluted sample) of the diluent and the sample is discharged through the first probe 27a into an empty collecting container 54 (Step S107). That is, in this embodiment, a collecting container 54 is reused by emptying the collecting container 54 originally storing the sample and then storing the diluted sample in the collecting container 54. In case of stirring the diluted sample (step S108), the collecting container 54 is installed in the stirring port 36a to perform stirring (step S109).

Note that in the above operation, when sucking the diluent through the first probe 27a is performed before sucking the sample through the first probe 27a, and sucking the sample through the first probe 27a is then performed, the sample and the diluent are mixed in the first probe 27a and in the flow path leading to the first probe 27a. However, the present invention is not limited to such an embodiment. Sucking the diluent is not performed before sucking the sample through the first probe 27a, but sucking the diluent and discharging the diluent to the collecting container 54 through the first probe 27a may be performed after discharging the sample through the probe 27a into the empty collecting container 54 is performed.

As a configuration for performing the above cleaning operation, instead of the configuration of FIG. 3, the configuration shown in FIGS. 10 to 13 may be adopted.

Figure 10:
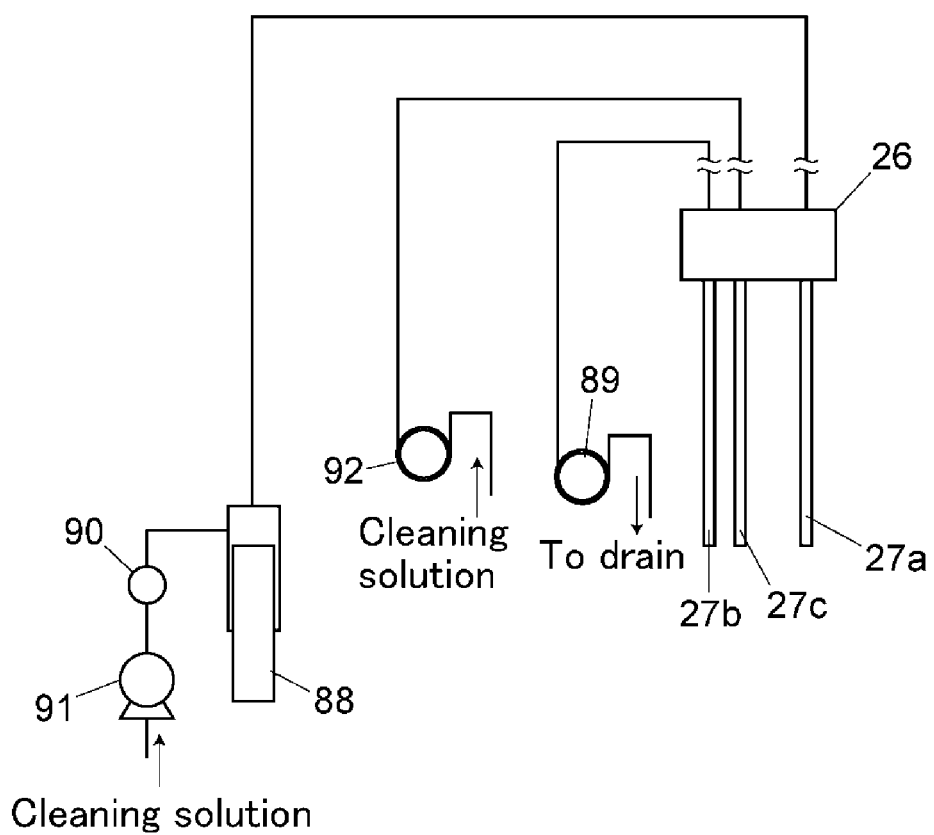
FIG. 10 is a schematic configurational flow path diagram showing another example of a flow path configuration of a probe in the embodiment.

In the configurational example of FIG. 10, the third probe 27c is connected not to the syringe pump 88 but to a peristaltic pump 92 for supplying a cleaning solution. Therefore, there is no three-way valve on the flow path connecting the first probe 27a to the syringe pump 88.

Figure 11:
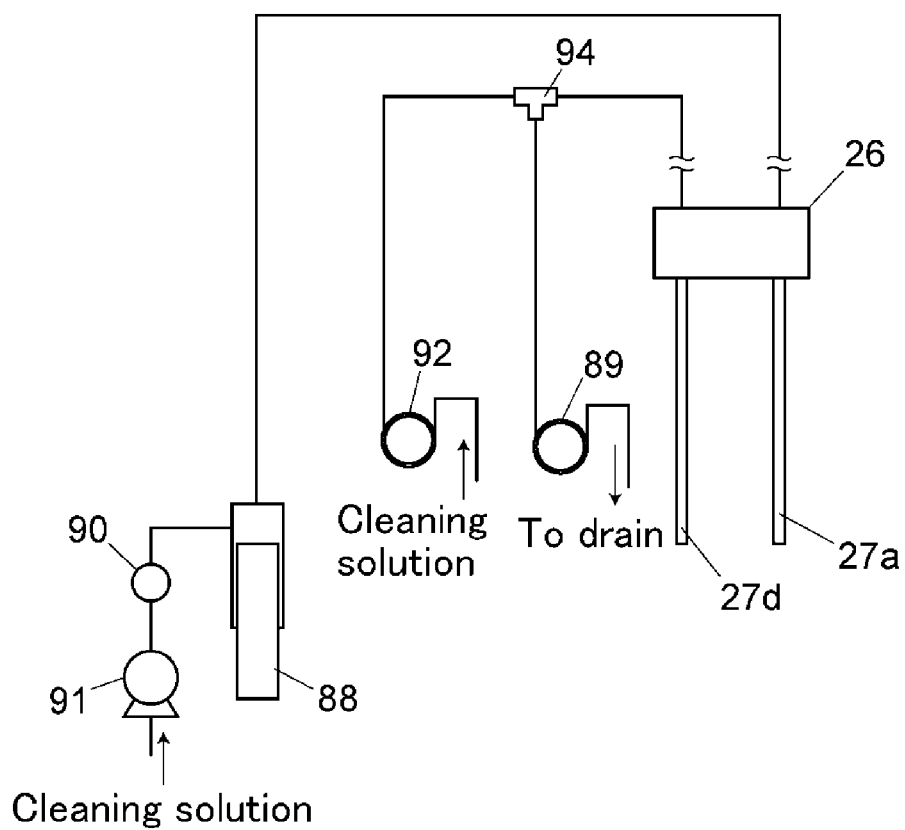
FIG. 11 is a schematic configurational flow path diagram showing still another example of a flow path configuration of a probe in the embodiment.

In the configurational example of FIG. 11, the reagent arm 26 is provided with a probe 27d having the roles of the second probe 27b and the third probe 27c in FIG. 3. A peristaltic pump 89 for discharging liquid into the drain and a peristaltic pump 92 for supplying a cleaning solution are connected to the base end of the probe 27d via a T-shaped joint 94. When sucking the sample or the cleaning solution through the tip of the probe 27d, the peristaltic pump 89 works and the peristaltic pump 92 stops. When discharging the cleaning solution through the tip of the probe 27d, the peristaltic pump 92 works and the peristaltic pump 89 stops.

Figure 12:
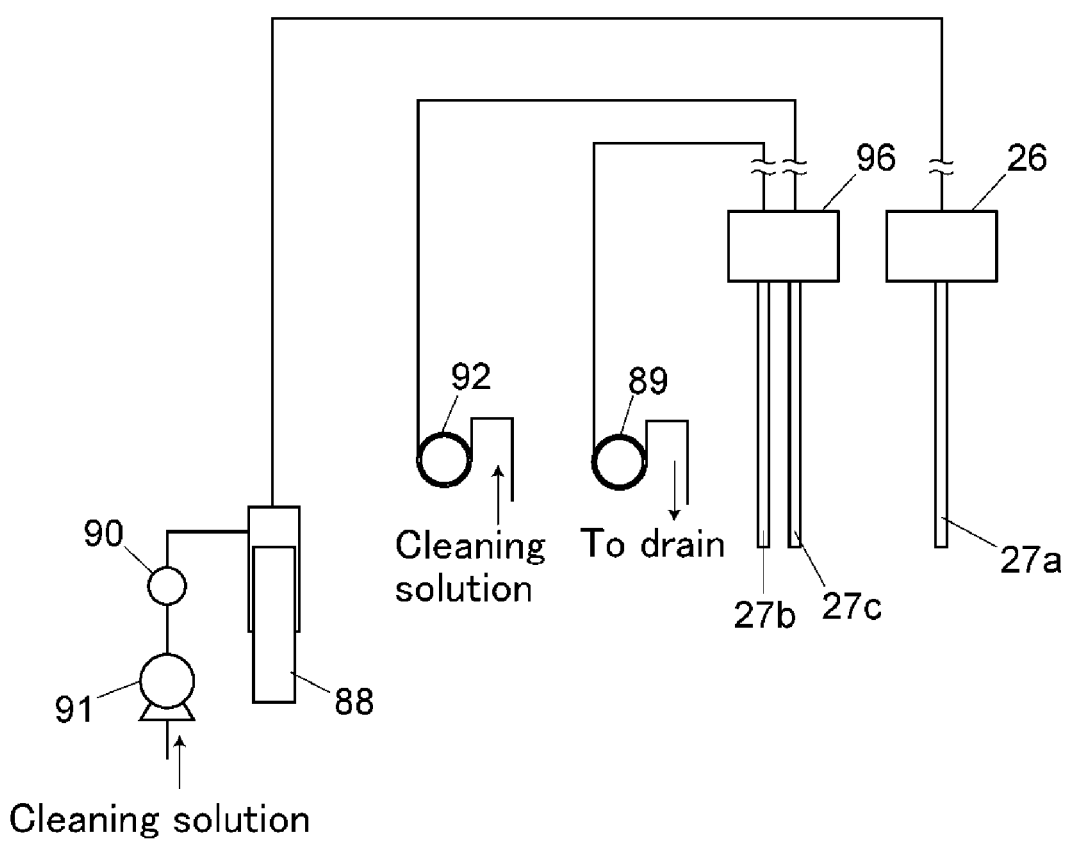
FIG. 12 is a schematic configurational flow path diagram showing still another example of a flow path configuration of a probe in the embodiment.

The configurational example of FIG. 12 is a configuration in which the second probe 27b and the third probe 27c in the configurational example of FIG. 10 are held by a driving mechanism 96 different from the reagent arm 26 so as to move them independently of the first probe 27a. The driving mechanism 96 may be an arm pivotally supported by the vertical shaft 29, like the reagent arm 26, or may be movable in a horizontal plane direction and a vertical direction by a separately provided driving system.

Figure 13:
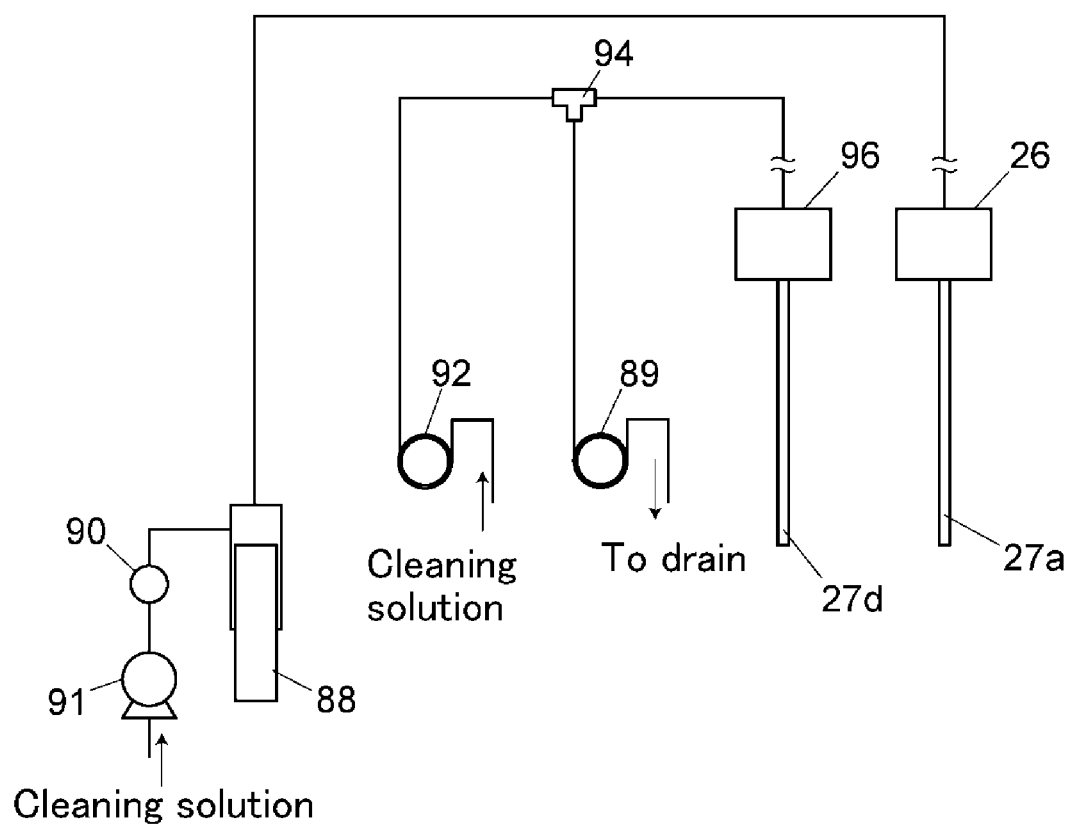
FIG. 13 is a schematic configurational flow path diagram showing still another example of a flow path configuration of a probe in the embodiment.

The configurational example of FIG. 13 is a configuration in which the probe 27d in the configurational example of FIG. 11 is held by a driving mechanism 96 different from the reagent arm 26 so as to move independently of the first probe 27a. In this case as well, the driving mechanism 96 may be an arm pivotally supported by the vertical shaft 29, like the reagent arm 26, or may be movable in a horizontal plane direction and a vertical direction by a separately provided driving system.

Figure 18:
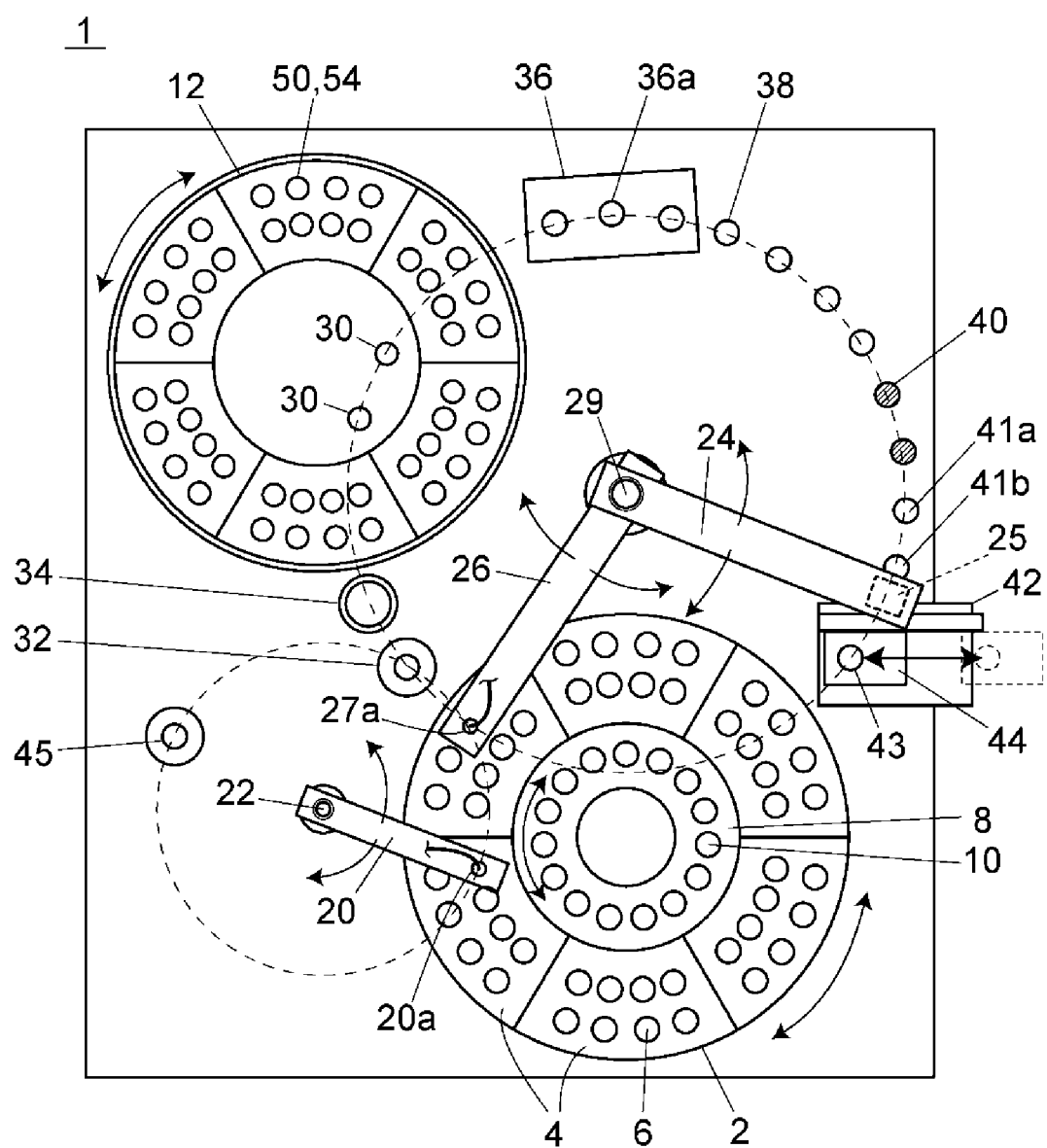
FIG. 18 is a plan view showing another embodiment of a pretreating apparatus.

Note that in the diluting operation, the collecting container 54 is reused, but a new collecting container 54 may be separately prepared so as to store the diluted sample. As an example thereof, as shown in FIG. 18, at least two diluting ports 41a, 41b are provided. In such an embodiment, it is unnecessary to suck a remaining sample in the collecting container 54 after a predetermined amount of sample is sucked through the first probe 27a, or it is unnecessary to clean the inside of the collecting container 54. Therefore, the second probe 27b and the third probe 27c are unnecessary, and in the embodiment of FIG. 18, only the probe 27a is provided at the tip of the reagent arm 26.

An example of the cleaning operation in the configuration of FIG. 18 is described with reference to the flowchart of FIG. 19. First, a predetermined amount of diluent is sucked through the first probe 27a (step S201), and then a predetermined amount of a pretreated sample is sucked from the collecting container 54 installed in one diluting port 41a or 41b (step S202). At this time, an empty collecting container 54 is installed in the other diluting port 41b or 41a by the transferring arm 24. The first probe 27a in which the predetermined amounts of diluent and sample have been sucked is inserted into the empty collecting container 54 installed in the other diluting port 41b or 41a and discharges the diluted sample to the collecting container 54 (step S203).

The collecting container 54 storing the remaining sample before being diluted is installed and stored in a predetermined storing place such as the pretreating container installing portion 12. Note that the operation of installing the collecting container 54 in a predetermined storing place may be performed at any timing before, simultaneously with, or after the operation of discharging the diluted sample through the first probe 27a.

Note that even when only one diluting port is provided as shown in FIG. 1, it is possible to store the diluted sample in a new collecting container 54 without reusing the collecting container 54. An example of the operation in this case is described below.

First, a predetermined amount of diluent is sucked through the first probe 27a, and then a predetermined amount of pretreated sample is sucked from the collecting container 54 installed in the diluting port 41. Thereafter, the collecting container 54 in the diluting port 41 is transferred to a predetermined installing place such as the pretreating container installing portion 12 by the transferring arm 24, and subsequently a new empty collecting container 54 is installed in the diluting port 41 by the transferring arm 24. Thereafter, the first probe 27a through which the predetermined amounts of diluent and sample have been sucked is inserted into the empty collecting container 54 installed in the diluting port 41 and discharges the diluted sample into the collecting container 54.

Next, a description is made of a separating device 550 and a collecting container 554 which can be used instead of the separating device 50 and the collecting container 54 as shown in FIGS. 2A to 2D with reference to FIGS. 16A, 16B, 17A, and 17B. In the following description, the points that the separating device 550 and the collecting container 554 are different from the separating device 50 and the collecting container 54 are described.

Figure 16A:
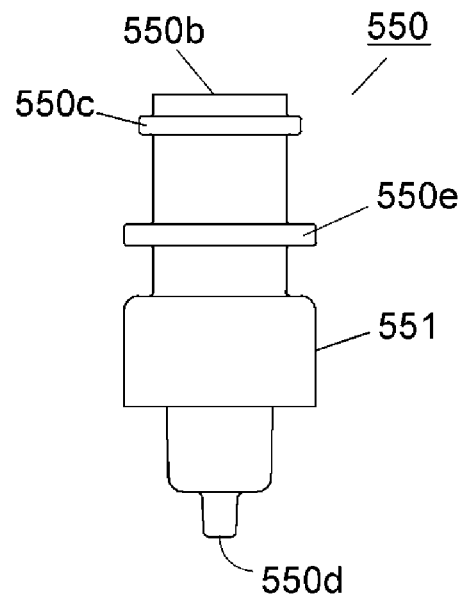
FIG. 16A is a front view showing another embodiment of a separating device of a pretreating container.
Figure 16B:
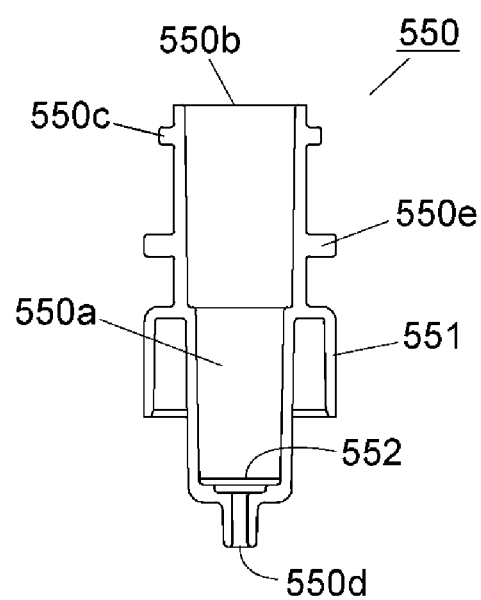
FIG. 16B is a cross-sectional view of the separating device.

In the separating device 550 as shown in FIGS. 16A and 16B, the inner diameter and the outer diameter of the portion below the root portion of a skirt portion 551 (the lower portion of the device) are smaller than those of the upper portion thereof. This lower portion of the device is housed in a space 554a in the collecting container 554. This allows the outer diameter of the portion on which a flange portion 550c of the separating device 550 is provided to be the same as the outer diameter of the portion on which a flange portion 554c of the collecting container 554 is provided. By doing so, the flange portion 550c of the separating device 550 and the flange portion 554c of the collecting container 554 can have completely the same shape and dimension, so that the holding portion of the transferring arm 24 can hold the separating device 550 and the collecting container 554 in the same way.

A protruding portion 550e protruding in a flange shape in a circumferential direction similarly to the flange portion 550c is provided between the flange portion 550c on the outer circumferential surface of the separating device 550 and the root portion of the skirt portion 551. The protruding portion 550e is provided at a position corresponding to the upper end portion of the inner wall surface of the stirring port 36a when the separating device 550 is installed in the stirring port 36a. The protruding portion 550e has the same outer diameter as that of the skirt portion 551, and abuts on the upper end portion of the inner wall surface of the stirring port 36a when stirring operation is performed, thereby preventing vibration of the separating device 550 in the stirring port 36a.

Figure 17A:
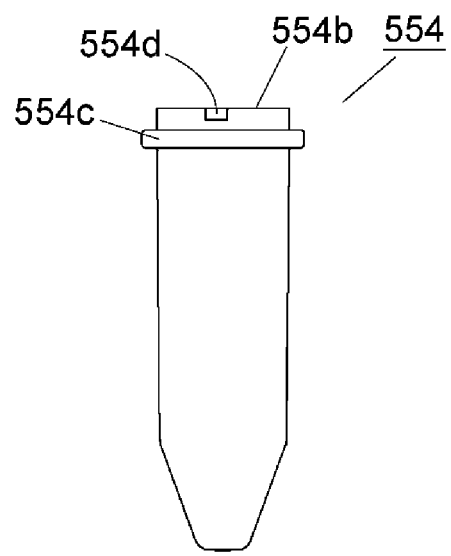
FIG. 17A is a front view showing another embodiment of a collecting container of a pretreating container.
Figure 17B:
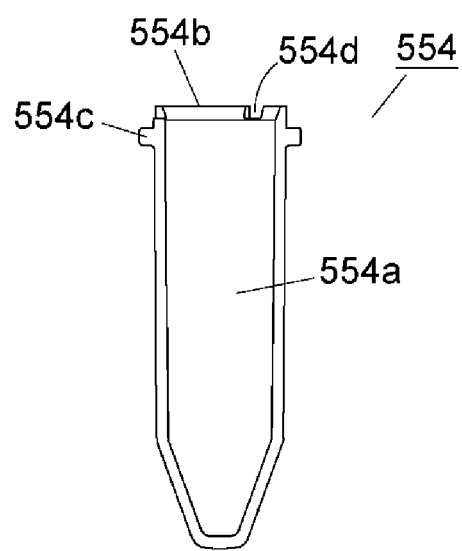
FIG. 17B is a cross-sectional view of the collecting container.

For the collecting container 554 shown in FIGS. 17A and 17B, notches 554d are provided at a plurality of positions (for example, three positions) on the edge of the upper opening 554b. When the separating device 550 and the collecting container 554 are integrated and the upper portion of the collecting container 554 enters the inside of the skirt portion 551 of the separating device 550, the notches 554d form openings through which air flows, between the inner wall surface of the root portion of the skirt portion 551 and the upper end portion of the collecting container 554. The filtrating treatment in the filtrating port 30 is performed in such a way that the integrated separating device 550 and collecting container 554 suck the air from the filtrating port 30 in a state where they are installed in the filtrating port 30, and the pressure in the collecting container 554 reaches a negative pressure. At this time, the air in the collecting container 554 passes through the openings formed by the notches 554d, so that the pressure in the collecting container 554 is efficiently reduced.

Figure 14:
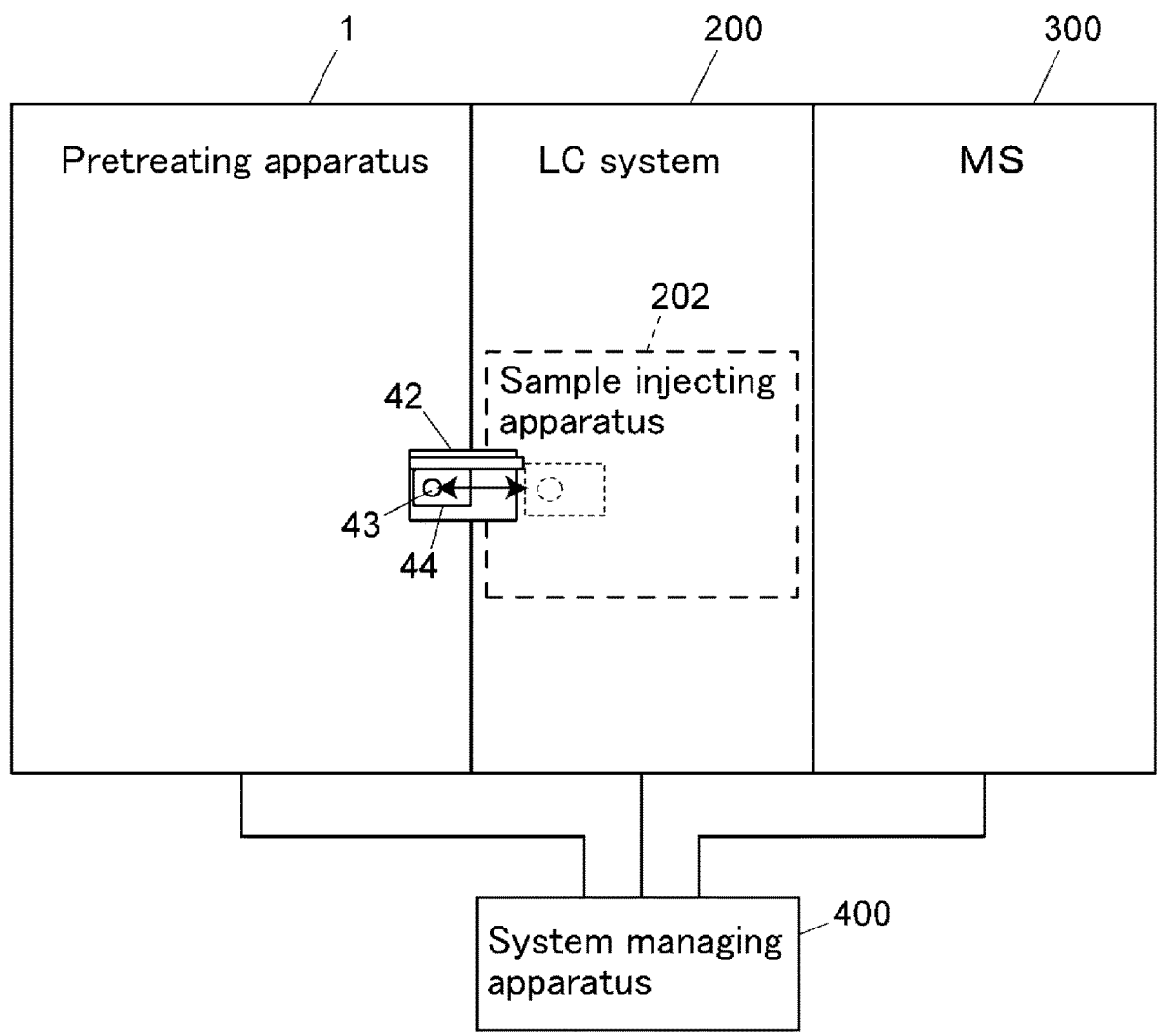
FIG. 14 is a block diagram schematically showing an embodiment of an analyzing system.

Next, a description is made of an embodiment of an analyzing system including the pretreating apparatus 1 with reference to FIG. 14.

An LC system 200 is disposed adjacent to the pretreating apparatus 1 described in the above embodiment, and further, a mass spectrometer (MS) is disposed adjacent to the LC system 200. Operation of the pretreating apparatus 1, LC system 200, and MS 300 is managed by a common system managing apparatus 400. The system managing apparatus 400 is a dedicated computer or a general PC provided with software for controlling and managing the pretreating apparatus 1, LC system 200, and MS 300, and also has the function of the arithmetic processor 100 in FIG. 7.

The LC system 200 includes a sample injecting apparatus 202 for collecting a sample pretreated in the pretreating apparatus 1 and injecting it into the analyzing flow path of the liquid chromatography apparatus. As described above, the pretreating apparatus 1 is provided with a transferring apparatus 42 for transferring the collecting container 54 (or 554) storing a pretreated sample toward the LC system 200, and the sample injecting apparatus 202 is configured to collect the sample from the collecting container 54 (or 554) transferred toward the LC system 200 by the transferring apparatus 42. When the moving portion 44 of the transferring apparatus 42 moves toward the LC system 200, the collecting container 54 (or 554) installed in the transferring port 43 of the moving portion 44 is placed at a predetermined position in the sample injecting apparatus 202.

When the collecting container 54 (or 554) storing a sample pretreated in the pretreating apparatus 1 is installed in the transferring port 43 of the transferring apparatus 42, and the moving portion 44 moves toward the LC system 200 and the collecting container 54 (or 554) is placed at a predetermined position in the sample injecting apparatus 202, a signal to that effect is transmitted to the sample injecting apparatus 202 via the system managing apparatus 400, so that the sample injecting apparatus 202 starts operation of collecting the sample from the collecting container 54 (or 554). The transferring apparatus 42 holds the collecting container 54 (or 554) at a predetermined position in the sample injecting apparatus 202 until the sample collecting operation by the sample injecting apparatus 202 is completed. Upon completion of the sample collecting operation by the sample injecting apparatus 202, a signal to that effect is transmitted to the pretreating apparatus 1 via the system managing apparatus 400, and the transferring apparatus 42 moves the moving portion 44 toward the pretreating apparatus 1 to return the collecting container 54 (or 554) to a predetermined position in the pretreating apparatus 1. The collecting container 54 (or 554) returned to the side of the pretreating apparatus 1 is transferred into the discarding port 34 by the transferring arm 24 to be discarded.

Figure 15:
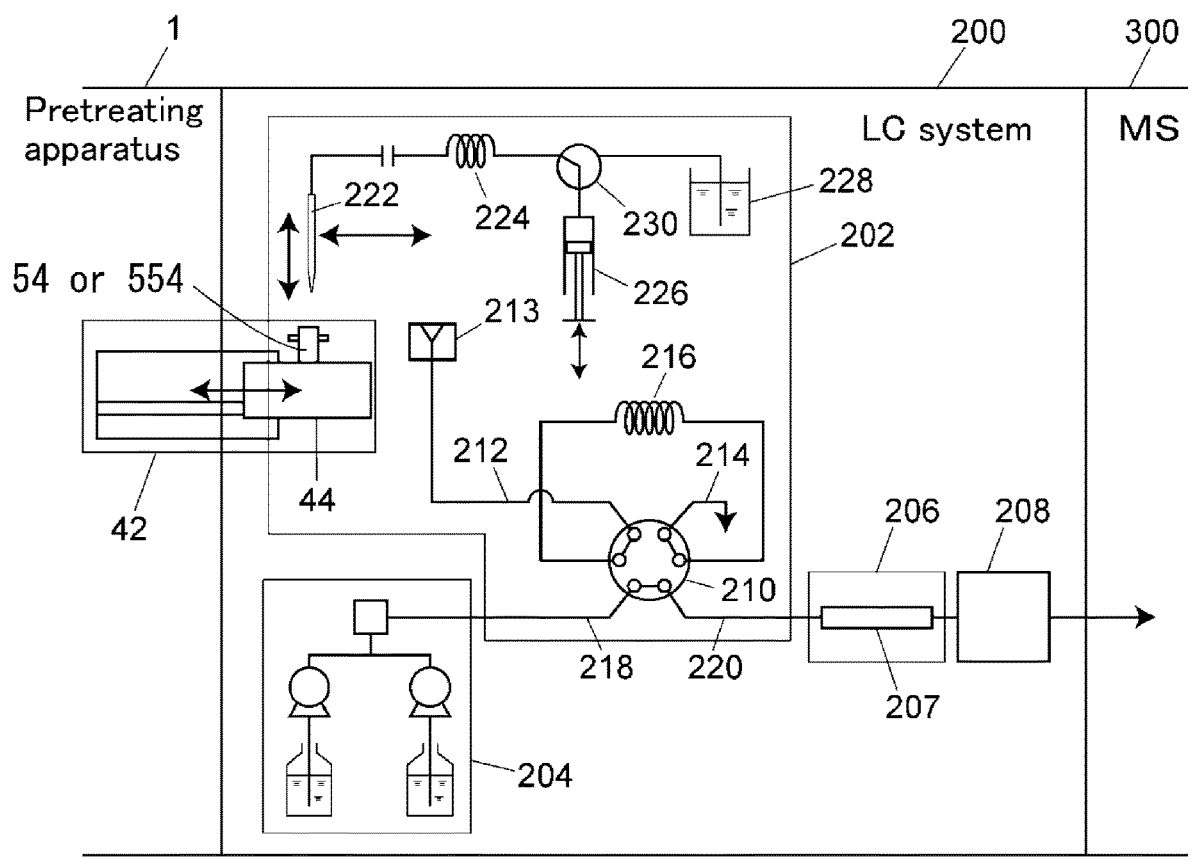
FIG. 15 is a flow path configurational diagram showing a configuration of a liquid chromatograph system in the embodiment.

A description is made of the LC system 200 in this embodiment with reference to FIG. 15.

In addition to the sample injecting apparatus 202, the LC system 200 includes a liquid feeding apparatus 204, a column oven 206, and a detector 208. The liquid feeding apparatus 204 is an apparatus for feeding, for example, two kinds of solvents by a liquid feeding pump to a mixer and feeding a solution mixed by the mixer as a mobile phase. The column oven 206 is provided with an analyzing column 207 for separating the sample for each component. The detector 208 is a detector such as an ultraviolet absorption detector for detecting sample components separated by the analyzing column 207.

The liquid feeding apparatus 204 is disposed at the upstream end of an upstream side analyzing flow path 218 and feeds the mobile phase through the upstream side analyzing flow path 218. The analyzing column 207 and the detector 208 are provided on a downstream side analyzing flow path 220. Both the upstream side analyzing flow path 218 and the downstream side analyzing flow path 220 are connected to ports in a two-position valve 210 provided on the sample injecting apparatus 202, and are connected to each other via the two-position valve 210.

The two-position valve 210 of the sample injecting apparatus 202 includes six ports. In addition to the upstream side analyzing flow path 218 and the downstream side analyzing flow path 220, one end and/or the other end of a sample introducing flow path 212, a drain flow path 214, and a sample loop 216 are connected to the respective ports of the two-position valve 210. In such a configuration, by switching the two-position valve 210, the state is switched to any one of states where (1) the sample introducing flow path 212, the sample loop 216, and the drain flow path 214 are connected in series, and the downstream side analyzing flow path 220 is connected to the immediate downstream of the upstream side analyzing flow path 218 (the state shown in FIG. 14), and (2) the upstream side analyzing flow path 218, the sample loop 216, and the downstream side analyzing flow path 220 are connected in series. The sample introducing flow path 212 leads to the injection port 213.

The sample injecting apparatus 202 includes a needle 222 capable of injecting or discharging liquid through the tip, and a syringe pump 226 connected to the needle 222 via a flow path. The needle 222 is configured to move in a horizontal direction and a vertical direction by a driving mechanism (not shown), capable of collecting a sample from the collecting container 54 (or 554) transferred to the side of the LC system 200 by the transferring apparatus 42, and injecting the sample through the injecting port 213. By switching a flow path switching valve 230, the syringe pump 226 is also connected to the cleaning solution container 228 storing a cleaning solution. By connecting the syringe pump 228 that has sucked the cleaning solution to the needle 222, and feeding the cleaning solution from the syringe pump 226 in a state where the needle 222 is connected to the injection port 213, the inner surfaces of the sample loop 224, the needle 222, and the sample introducing flow path 212 can be cleaned.

When collecting a sample from the collecting container 54 (or 554), the tip of the needle 22 is inserted into the collecting container 54 (or 554), and the sample is sucked by the syringe pump 226 and held in the sample loop 224 disposed between the needle 222 and the syringe pump 226. The sample held in the sample loop 224 is injected through the injection port 213. When the sample is injected through the injection port 213, the two-position valve 210 is put into a state where (1) the sample introducing flow path 212, the sample loop 216, and the drain flow path 214 are connected in series, and the sample injected through the injection port 213 is held in the sample loop 216. Thereafter, by switching the two-position valve 210 to be in a state where (2) the upstream side analyzing flow path 218, the sample loop 216, and the downstream side analyzing flow path 220 are connected in series, the sample retained in the sample loop 216 is guided by the mobile phase from the liquid feeding apparatus 204 to the analyzing column 207 to be separated for each component in the analyzing column 207. The respective components separated in the analyzing column 207 are detected by the detector 208 and then further introduced into the MS 300.

Signals obtained by the detector 208 or the MS 300 are taken by the system managing apparatus 400 (see FIG. 14), and arithmetic processing such as quantification of each component separated by the analyzing column 207 or composition analysis of each component is performed by software incorporated in the system managing apparatus 400 and hardware such as a CPU that executes the software.

DESCRIPTION OF REFERENCE SIGNS

1: Pretreating apparatus
2: Sample installing portion
4: Sample rack
6: Sample container
8: Reagent installing portion
10: Reagent container
12: Pretreating container installing portion
20: Sampling arm
20a: Sampling nozzle
22, 29: Shaft
24: Transferring arm
25: Holding portion
26: Reagent arm
27a: First probe
27b: Second probe
27c: Third probe
30: Filtrating port
31: Collecting container holding member
32: Dispensing port
34: Discarding port
36: Stirring portion
36a: Stirring port
38: Temperature controlling port for separating device
40: Temperature controlling port for collecting container
41, 41a, 41b: Diluting port
42: Transferring apparatus
43: Transferring port
44: Moving portion
45: Cleaning port
50, 550: Separating device
50a, 550a: Internal space in separating device
50b, 550b: Opening in separating device
50c, 550c: Flange portion on separating device
50d, 550d: Extracting port
550e: Protruding portion
51, 551: Skirt portion
52, 552: Separating layer
52a: Deproteinizing filter
52b: Prefilter
54, 554: Collecting container
54a, 554a: Internal space in collecting container
54b, 554b: Opening in collecting container
54c, 554c: Flange on collecting container
554d: Notch
55: Pressure loading mechanism
56: Hole
57: Piping
58: Vacuum pump
60: Sealing member
62, 68: Pressure sensor
64, 70: Three-way valve
72: Supporting hole
73: Upper end portion of stirring port
74: Driving shaft
76: Rotating body
78: Rotating shaft
80: Motor
82: Supporting frame
83: Elastic member
84, 150: Controlling portion
84a, 150a: Pretreating unit
84b, 150b: Treatment state managing unit
84c, 150c: Random access unit
84d: Diluting unit
87: Three-way valve
88: Syringe pump
89, 92: Peristaltic pump
90: Solenoid valve
91: Pump
96: Driving mechanism
100: Arithmetic processor
200: LC system
202: Sample injecting apparatus
204: Liquid feeding apparatus
206: Column oven
207: Analyzing column
208: Detector
210: Two-position valve
212: Sample introducing flow path
213: Injection port
214: Drain flow path
216, 224: Sample loop
218: Upstream side analyzing flow path
220: Downstream side analyzing flow path
222: Needle
226: Syringe pump
228: Cleaning solution container
230: Switching valve
300: MS
400: System managing apparatus

The invention claimed is:

1. A pretreating apparatus configured to be arranged adjacent to a liquid chromatograph system for performing liquid chromatography analysis on a sample pretreated in the pretreating apparatus, the pretreating apparatus comprising:
a transferring arm configured to transfer a container;
a pretreating part including a first pretreating port configured to receive the container storing the sample from the transferring arm and pretreat the sample in the container installed in the first pretreating port;
an arm comprising at least one probe configured to supply a diluent;
a transferring rack including a transferring port for receiving the container from the transferring arm, the transferring rack being configured to transfer the container from the transferring port to the liquid chromatograph system, and
a controller comprising a computer and software executed by the computer, the controller being configured to control operation of the transferring arm, the pretreating part, and the arm, wherein
the controller is further configured to:
determine whether the sample is to be diluted based on an analytical condition set for a liquid chromatography analysis to be performed to the sample in the liquid chromatograph system,
control the transferring arm to set the container, in which the sample pretreated by the pretreating part is contained, in the transferring port, control the transferring rack to transfer the container containing the sample from the transferring port to the liquid chromatograph system, and control the arm to dilute the sample, before transferring the sample from the transferring port to the liquid chromatograph system, based on the determination that the sample is to be diluted.

2. The pretreating apparatus according to claim 1, wherein the arm comprises a first probe and a second probe, each of the first probe and the second probe being configured to suck and discharge liquid, the arm being configured to suck a predetermined amount of the sample from the container through the first probe, and then suck any remaining sample from the container through the second probe.

3. The pretreating apparatus according to claim 2, wherein the arm is configured to suck the diluent through the first probe and then suck the pretreated sample from the container storing the pretreated sample through the first probe.

4. The pretreating apparatus according to claim 2, wherein the arm is configured to discharge the sample through the first probe to the container, out of which the remaining sample has been sucked through the second probe.

5. The pretreating apparatus according to claim 4, wherein the arm is configured to suck the remaining sample from the container through the second probe, then supply a cleaning solution into the container and suck the cleaning solution out of the container, and subsequently discharge the predetermined amount of the sample through the first probe.

6. The pretreating apparatus according to claim 5, wherein the arm further comprises a third probe configured to discharge the cleaning solution.

7. The pretreating apparatus according to claim 6, wherein the arm is configured to, after sucking the predetermined amount of the sample from the container through the first probe, simultaneously insert the second probe and the third probe into the container, suck the remaining sample from the container through the second probe, and subsequently supply the cleaning solution through the third probe into the container and suck the cleaning solution through the second probe.

8. The pretreating apparatus according to claim 2, wherein the first probe and the second probe are configured to move in a horizontal plane and a vertical direction by a common driving mechanism.

9. The pretreating apparatus according to claim 1, further comprising a pretreated sample port configured to store the container storing the sample that has been pretreated,
wherein the transferring arm is configured to transfer the container storing a remaining sample into the pretreated sample port after a predetermined amount of the sample is sucked by the arm.

10. The pretreating apparatus according to claim 1, further comprising a diluting port configured to hold the container while the sample is diluted by the arm,
wherein the container storing the sample that has been pretreated is installed in the diluting port by the transferring arm.

11. The pretreating apparatus according to claim 1, wherein the arm comprises a first probe and a second probe, each of the first probe and the second probe being configured to suck and discharge liquid.

12. The pretreating apparatus according to claim 1, wherein the transferring arm and the arm rotate around a common axis.

13. The pretreating apparatus of claim 1, wherein the pretreating part further comprises a second pretreating port, and wherein the first pretreating port comprises a first sensor configured to produce a signal that indicates whether the container is in the first pretreating port;
wherein the second pretreating port and comprises a second sensor configured to produce a signal that indicates whether the container is in the second pretreating port;
wherein the controller is further configured to:
determine availability of the first pretreating port and the second pretreating port based on the signals produced by the first sensor and the second sensor; and
control the transferring arm to transfer the container based on the determined availability.

14. An analyzing system, comprising:
a liquid chromatograph system for performing liquid chromatography analysis on a sample; and
a pretreating apparatus configured to be arranged adjacent to the liquid chromatograph system for pretreating the sample, the pretreating apparatus comprising
a transferring arm configured to transfer a container;
a pretreating part including a first pretreating port configured to receive the container storing the sample from the transferring arm and pretreat the sample in the container installed in the first pretreating port;
an arm comprising at least one probe configured to supply a diluent;
a transferring rack including a transferring port for receiving the container from the transferring arm, the transferring rack being configured to transfer the container from the transferring port to the liquid chromatograph system, and
a controller comprising a computer and software executed by the computer, the controller being configured to control operation of the transferring arm, the pretreating part, and the arm, wherein
the controller is further configured to:
determine whether the sample is to be diluted based on an analytical condition set for a liquid chromatography analysis to be performed to the sample in the liquid chromatograph system,
control the transferring arm to set the container, in which the sample pretreated by the pretreating part is contained, in the transferring port,
control the transferring rack to transfer the container containing the sample from the transferring port to the liquid chromatograph system, and
control the arm to dilute the sample, before transferring the sample from the transferring port to the liquid chromatograph system, based on the determination that the sample is to be diluted; and
the liquid chromatograph system arranged adjacent to the pretreating apparatus, having an analyzing flow path through which a mobile phase flows, a sample injecting apparatus configured to collect the sample in the container moved outside the pretreating apparatus by the transferring rack and inject the collected sample into the analyzing flow path, an analyzing column arranged on the analyzing flow path, the analyzing column configured to separate the sample injected by the sample injecting apparatus for each component, and a detector configured to detect sample components separated by the analyzing column.

* * * * *